(12) United States Patent
Kumar

(10) Patent No.: US 9,047,353 B2
(45) Date of Patent: *Jun. 2, 2015

(54) SPACE-TIME-NODE ENGINE SIGNAL STRUCTURE

(71) Applicant: Space-Time Insight, San Mateo, CA (US)

(72) Inventor: Krishna Kumar, San Mateo, CA (US)

(73) Assignee: Space-Time Insight, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,925

(22) Filed: Jun. 3, 2014

(65) Prior Publication Data

US 2014/0337390 A1    Nov. 13, 2014

Related U.S. Application Data

(62) Division of application No. 13/100,212, filed on May 3, 2011, now Pat. No. 8,768,873.

(51) Int. Cl.
*G06N 7/02* (2006.01)
*G06F 9/44* (2006.01)
*G06F 17/30* (2006.01)
*H04L 12/24* (2006.01)
*G06Q 10/06* (2012.01)

(52) U.S. Cl.
CPC ........ *G06F 17/30569* (2013.01); *H04L 41/145* (2013.01); *G06Q 10/06* (2013.01)

(58) Field of Classification Search
None
See application file for complete search history.

(56) References Cited

U.S. PATENT DOCUMENTS

| 6,064,759 | A  | * | 5/2000  | Buckley et al. ............... 382/154 |
| 6,567,815 | B1 |   | 5/2003  | Rubin et al. |
| 6,862,613 | B1 |   | 3/2005  | Kumar et al. |
| 7,212,217 | B1 |   | 5/2007  | Feather et al. |
| 7,333,454 | B2 |   | 2/2008  | Yang et al. |
| 7,529,207 | B2 |   | 5/2009  | Jagana et al. |
| 7,843,871 | B2 |   | 11/2010 | Jagana et al. |
| 7,873,735 | B2 |   | 1/2011  | Jain et al. |
| 7,899,456 | B2 |   | 3/2011  | Jagana et al. |
| 7,920,513 | B2 |   | 4/2011  | Jagana et al. |
| 7,990,924 | B2 |   | 8/2011  | Jagana et al. |
| 2007/0293985 | A1 | * | 12/2007 | Myeong et al. ............... 700/245 |
| 2010/0085234 | A1 | * | 4/2010  | Steinway et al. ............... 342/22 |
| 2011/0241933 | A1 | * | 10/2011 | Nishiyama et al. ........... 342/179 |

OTHER PUBLICATIONS

George et al., "Spatio-Temporal Sensor Graphs (STSG): A Data Model for the Discovery of Spatio-Temporal Patterns", Intelligent Data Analysis, 2009 pp. 9.
Niebles, et al. "Unsupervised Learning of Human Action Categories Using Spatial-Temporal Words", Int J Compt Vis, 2008, pp. 20.
U.S. Appl. No. 13/100,212, filed May 3, 2011, 110 pages.
U.S. Appl. No. 13/100,212: Notice to file missing parts and filing receipt, mailed May 17, 2011, 5 pages.

(Continued)

*Primary Examiner* — Li-Wu Chang
(74) *Attorney, Agent, or Firm* — Berkeley Law & Technology Group, LLP

(57) ABSTRACT

Example methods, apparatuses, or articles of manufacture are disclosed that may be implemented using one or more computing devices or platforms to facilitate or otherwise support one or more processes or operations associated with a space-time-node engine signal structure.

16 Claims, 17 Drawing Sheets

(56) References Cited

OTHER PUBLICATIONS

U.S. Appl. No. 13/100,212: Response to notice to file missing parts, mailed Jun. 8, 2011, 27 pages.
U.S. Appl. No. 13/100,212: Updated filing receipt, mailed Jun. 20, 2011, 3 page.
U.S. Appl. No. 13/100,212: Notice of publication, mailed Nov. 8, 2012, 1 page.
U.S. Appl. No. 13/100,212: Restriction requirement, mailed Jul. 19, 2013, 4 pages.
U.S. Appl. No. 13/100,212: Non-Final Office Action, mailed Aug. 5, 2013, 15 pages.
U.S. Appl. No. 13/100,212: Response to Non-Final office action, mailed Oct. 23, 2013, 19 pages.
U.S. Appl. No. 13/100,212: Final Rejection, mailed Nov. 18, 2013, 15 pages.
U.S. Appl. No. 13/100,212: Response after Final Action, filed Jan. 21, 2014, 21 pages.
U.S. Appl. No. 13/100,212: Amendment after Final, filed Jan. 30, 2014, 1 page.
U.S. Appl. No. 13/100,212: Response and Amendments after Final, filed Feb. 18, 2014, 10 pages.
U.S. Appl. No. 13/100,212: Examiner's Search and Initialed amendment, mailed Feb. 27, 2014, 2 pages.
U.S. Appl. No. 13/100,212: Notice of Allowance and Fees, mailed Feb. 27, 2014, 5 pages.
U.S. Appl. No. 13/100,212: Issue Fee Payment, mailed May 23, 2014, 1 page.
U.S. Appl. No. 13/100,212: Issue Notification, mailed Jun. 11, 2014.
U.S. Appl. No. 13/280,313: Application as filed on Oct. 24, 2011, 111 pages.
U.S. Appl. No. 13/280,313: Filing receipt and Notice to file missing parts, mailed Nov. 7, 2011, 5 pages.
U.S. Appl. No. 13/280,313: Response to Notice to file missing parts, mailed Nov. 21, 2011, 27 pages.
U.S. Appl. No. 13/280,313: Updated filing receipt, mailed Dec. 2, 2011, 3 pages.
U.S. Appl. No. 13/280,313: Notice of publication, mailed Nov. 8, 2012, 1 page.
U.S. Appl. No. 13/280,313: Notice of allowance and fees due, mailed Oct. 18. 2013, 11 pages.
U.S. Appl. No. 13/280,313: Issue Fee Payment, mailed Jan. 21, 2014, 1 page.
U.S. Appl. No. 13/280,313: Issue Notification, mailed Feb. 16, 2014, 1 page.
U.S. Appl. No. 14/160,050: Application as filed on Jan. 21, 2014, 114 pages.
U.S. Appl. No. 14/160,050: Filing Receipt, mailed Feb. 5, 2014, 3 pages.
U.S. Appl. No. 14/160,050: Preliminary Amendment, filed Feb. 13, 2014, 8 pages.
U.S. Appl. No. 14/160,050: Filing Receipt, mailed Feb. 24, 2014, 3 pages.
U.S. Appl. No. 14/160,050: Notice of Publication, mailed Jun. 5, 2014, 1 page.

* cited by examiner

STING (Space TIme Nodal Grain)

Structure of a STING whose payload changes rapidly with time (e.g. profile of an AC wave)

Structure of a STING whose payload changes rapidly with space (e.g. an in-flight missile)

Structure of a STING whose payload changes rapidly with nodal points (e.g. electric circuit)

FIG. 4

|  | Field name | Source |
|---|---|---|
| General | | |
| | UUID | Vendor / Device Defined |
| | Default_Dominance_Type | Vendor / By ecosystem file |
| | Auto-determine_dominance_type | Vendor / Device Defined |
| | Default_Spatial_Resolution | Vendor / Device Defined |
| | Default_Temporal_Resolution | Vendor / Device Defined |
| | Default_Dominant_Metric_Pointer | Defined in the Ecosystem File |
| Signal Structures | | |
| | Average_Data_Payload_to_communication_byte_ratio | Vendor / Device Defined |
| | Average_Data_Payload_to_security_byte_ratio | Vendor / Device Defined |
| | Average_Data_Payload_to_temporal_byte_ratio | Vendor / Device Defined |
| | Average_Data_Payload_to_spatial_byte_ratio | Vendor / Device Defined |
| | Average_Data_Payload_to_security_byte_ratio | Vendor / Device Defined |
| | Average_Number_of_STING_cells_per_Payload | Vendor / Device Defined |
| Training & Indexing | | |
| | Training_needed_flag | Defined in the Ecosystem File |
| | Training_interval | Defined in the Ecosystem File |
| | Is_Correlation_training_needed | Defined in the Ecosystem File |
| | Percentage_of_points_needed_for_training | Defined in the Ecosystem File |
| | Type_of_training_factory_to_be_used | Defined in the Ecosystem File |
| | What_Order_Derivative_is_needed_for_Pearson'_training | Defined in the Ecosystem File |
| | Clustering_needed | Defined in the Ecosystem File |
| | Is_Kmeans_clustering | Defined in the Ecosystem File |
| | Percentage_of_points_needed_for_random_in_kmeans_clustering | Defined in the Ecosystem File |
| | K-means_dimension_selection | Defined in the Ecosystem File |
| | K-means_distance_calculator | Defined in the Ecosystem File |
| | Nodal_distance_calculator | Defined in the Ecosystem File |
| | Graph_type | Defined in the Ecosystem File |
| | Nodal_Search_startegy | Defined in the Ecosystem File |
| | K-means_number_of_"k"_values_needed_for_clustering | Defined in the Ecosystem File |
| | K_means_maximum_iterations | Defined in the Ecosystem File |
| | K_means_convergence_distance | Defined in the Ecosystem File |
| | Indexing Strategy | Vendor / Device Defined |
| Signal Processing | | |
| | Approximation_allowed_indicator? | Defined in the Ecosystem File |
| | Delta_compression_allowed_(Yes/No_flag)_-_Boolean_field | Defined in the Ecosystem File |
| | Delta_Compression_Factory | Defined in the Ecosystem File |
| | Delta_Threshold | Defined in the Ecosystem File |
| | Signal_Consolidation_Allowed | Defined in the Ecosystem File |
| | Manifest_Consolidation_Allowed | Defined in the Ecosystem File |
| | Negotiation_reread_after_number_of_processes | Defined in the Ecosystem File |
| Memory Sweep | | Defined in the Ecosystem File |
| | memory_sweep_distance_calculator | Defined in the Ecosystem File |

*FIG. 4A*

| Description | Type | allowed values |
|---|---|---|
| UUID of the device type-what type of device is being considered. For example it could be an IP address, MAC address, or a UID with which the device can be identified without ambiguity. | String | Any |
| The most dominant characteristic within the Signal Vectors provided by the vendor | String | SPATIAL, TEMPORAL, NODAL, SPATIO_TEMPORAL, SPATIO_NODAL, NODAL_TEMPORAL |
| Determine the dominance type automatically | boolean | Yes, No |
| This is bounding box (represented by height and width in meters) | String | Any |
| this is represented as a String for example 10 ms ..Indicating 10 milli seconds | String | Any |
| this field indicates the most dominant metric within a signal stream .. For example for a thermostat stream, it would be a temperture field | String | Any |
| how many data payload bytes are transmitted for every communication byte | double | Any |
| how many data payload bytes are transmitted for every security byte | double | Any |
| how many data payload bytes are transmitted for every temporal byte | double | Any |
| how many data payload bytes are transmitted for every spatial byte | double | Any |
| how many data payload bytes are transmitted for every security byte | double | Any |
| how many cells does an average payload contain | integer | Any |
| Is training needed for processing signals | boolean | 1,0 |
| how often is training needed (how many reads) | String | sample values are 5 min, 2000 signals, 45 days |
| Does you need to apply correlation based training for signal processing | boolean | Yes, No |
| What percentage of points are useful for training | double | Any |
| Factory class that implements the training process | String | com.spacetimeinsight.training.PearsonsTraining |
| What derivative order is needed for training the system | integer | 0 is no derivative,1 is dx/dt ,2 d2x/dt2,3,4 |
| Is clustering needed for training the system | boolean | Yes, No |
| Is K-means clustering used for training the system | boolean | Yes, No |
| What percentage of points are useful for randomization that is passed to kmeans clustering | double | Any |
| What dimensions are used for K-means clustering | String | e.g. {dimension_1=x, dimension_2=y, dimension_3=temperature} |
| What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| Default Nodal Distance Calculator | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| Type of Graph | String | e.g. bipartite, Cayley |
| Nodal Search Strategy | String | e.g. Breadth First Search (BFS) |
| how many "k" values are nedded for cluster computation | String | e.g. values are automatic, 15 clusters |
| Maximum number of iterations before which the K means algorithm is expected to converge | double | Any |
| Maximum distance before the system deems the convergence to have be accomplished | double | Any |
| What indexing strategy is employed for performance optimization | String | KD-Tree, R Tree, Bitmap, Binary Tree (BSP) |
| Is approximation for fitting missing intermediary values | boolean | Yes, No |
| Is Delta compression allowed | boolean | Yes, No |
| Determine what type of Delta compression needs to be implemented. The reference is to a factory class. The factory class ensures that the actually implementation is done by the vendor for the STING Adapter. | String | com.spacetimeinsight.training.DeltaCompression withIntermediaries |
| Value below which lossy compression is permitted | double | 0.01 (degrees centigrade) |
| Can Signals be consolidated and transmitted as a single value | boolean | Yes, No |
| Can Spatial, nodal, temporal, Security & Communication be consolidated into a single manifest | boolean | Yes, No |
| When do you want to perform "re-negotiation" | String | sample values are 5 min, 2000 signals, 45 days |
| What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |

*FIG. 4B*

SPACE-TIME-NODE ENGINE SIGNAL STRUCTURE

BACKGROUND

1. Field

The present disclosure relates generally to an in-memory organization or architecture and, more particularly, to a space-time-node engine signal structure for use in or with an in-memory organization or architecture.

2. Information

Information is everywhere. A wide variety of information, such as, for example, business information, social information, service information, scientific information, environmental information, or the like is continually being generated, accessed, shared, collected, communicated, stored, or analyzed. Information databases or warehouses including, for example, relational, multi-dimensional, transactional, hierarchical, or other like information repositories are becoming more common place as well as related communications networks or computing resources that provide access to various types of information.

Today, a variety of information from a variety of sources may be used in some manner to analyze, visualize, forecast, leverage, etc. various social, political, geographical, regulatory, business, or like segments to facilitate or support intelligent approaches for business decision-making, performance management, market research, situational awareness, or the like. For example, information may be used by project or performance management applications to deliver tailored approaches helping to gain a competitive advantage by improving work-flow or operating procedures, acquiring business insights, assessing risks or opportunities, creating or maintaining regulatory compliance infrastructure, or the like. With an overabundance of diverse information being available or otherwise accessible, information processing tools or techniques continue to evolve or improve. At times, however, processing or organizing information may prove to be a computationally complex, time-consuming, or otherwise resource-demanding task, which may present a number of challenges, such as increased processing time, complexity, cost, or the like. Accordingly, how to process or organize diverse information in an effective or efficient manner continues to be an area of development.

BRIEF DESCRIPTION OF THE DRAWINGS

Non-limiting or non-exhaustive aspects are described with reference to the following figures, wherein like reference numerals refer to like parts throughout the various figures unless otherwise specified.

FIG. 4 is an implementation of an example manifest file.

FIGS. 4A and 4B are respective enlarged areas A and B of the manifest file of FIG. 4.

DETAILED DESCRIPTION

Figure 1:
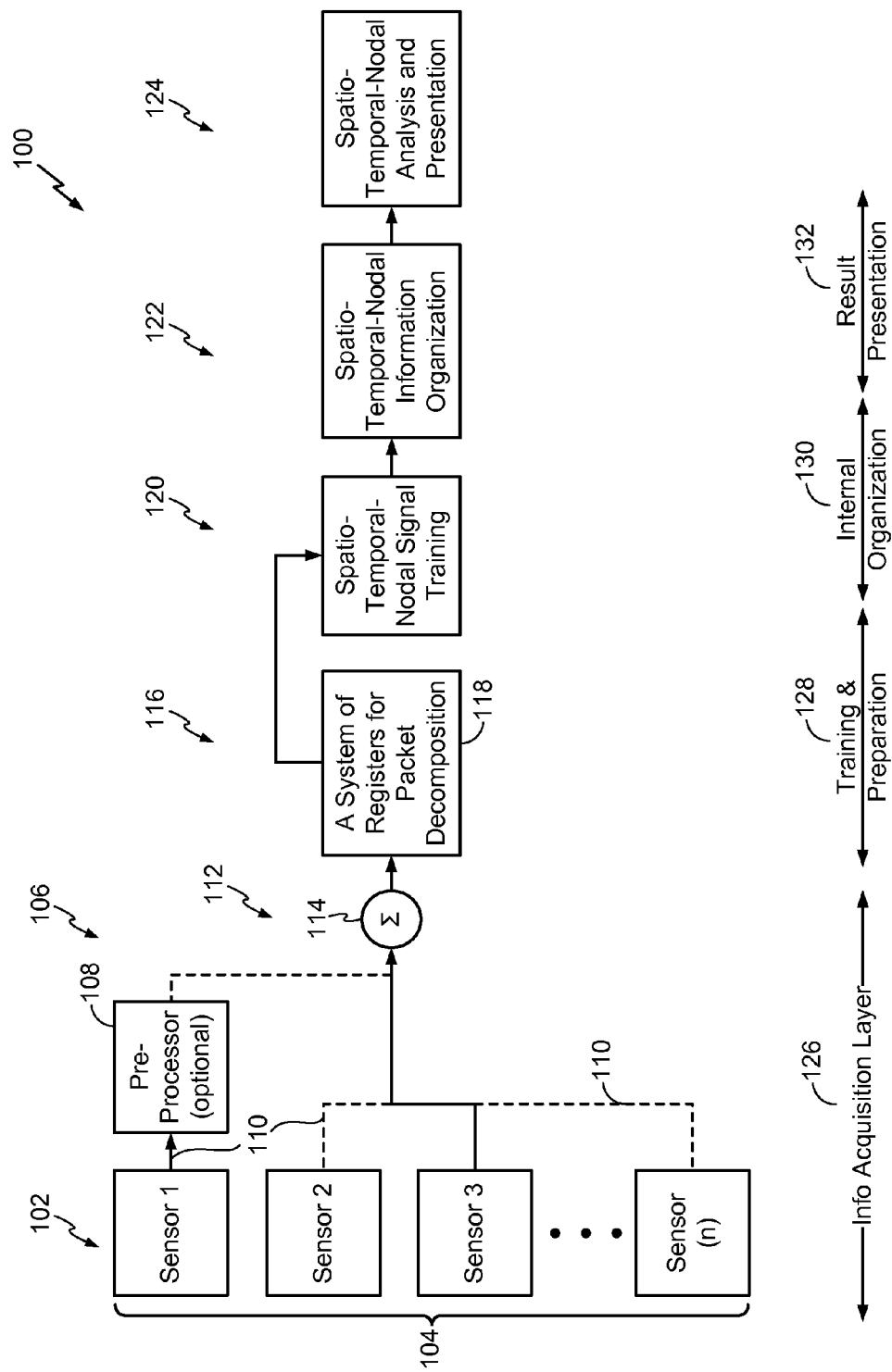
FIG. 1 is a flow diagram of an implementation of an example process for performing multi-source signal processing.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques associated with a space-time-node engine signal structure. As described below, a space-time-node engine signal structure may be implemented using one or more signal processing operations or techniques, such as, for example, one or more space-time-node engine-facilitated or supported signal processing operations or techniques. In this context, a space-time-node engine may refer to a special purpose computing environment, platform, or construct capable of formulating or executing tailored approaches that may be based, at least in part, on processing signals as a function of spatially, temporally, or nodally-dominant metrics or attributes associated with these signals. In some instances, space-time-node engine-facilitated or supported approaches may comprise, for example, hardware, firmware, or software-implemented approaches, or any combination thereof, and signals may comprise, for example, multi-source signals, though claimed subject matter is not so limited.

As used herein, "multi-source signals" may refer to one or more digital signals, including multi-speed digital signals, for example, that may be sampled or otherwise acquired, in real-time or otherwise, from a variety of information sources in a variety of formats. In this context, "real time" may refer to an amount of timeliness of content or information, which may have been delayed by an amount of time attributable to electronic communication as well as other information or signal processing. A format may refer to any suitable representation, medium, type, form, protocol, or the like of any quantity, value, property, phenomenon, condition, etc. associated with a signal and capable of being captured, converted, communicated, conveyed, or otherwise sampled in some manner in connection with one or more space-time-node engine-facilitated or supported signal processing operations or techniques. Multi-source signals may be representative of any type or category of information, such as, for example, electric grid information, smart meter information, social media information, environment information, business intelligence (BI) information, navigation or positioning information, radio-frequency identification (RFID) or credit card information, resource planning or asset management information, enterprise performance information, traffic congestion or toll collection information, or the like. As will be seen, multi-source signals may be sampled or acquired using any suitable communications framework that may employ one or more special purpose computing platforms, software application programming interfaces (API), communication protocols, subscriptions or feeds, such as Open Database Connectivity (ODBC) interface, Real Simple Syndication (RSS) or Atom Syndication (Atom)-based subscription feeds, or the like. Of course, details relating to multi-source signals are merely examples, and claimed subject matter is not limited in this regard.

As described below, multi-source signals representative of various information of interest may be used, in whole or in part, to facilitate or support better decision-making, business-related or otherwise, to perform desired-practice analyses, assess regulatory exposure risks, leverage or manage enterprise uncertainties, improve supply-demand economics, develop dynamic pricing mechanisms, or the like. To illustrate, in the renewable energy sector, utility companies, independent system operators (ISO), regional transmission organizations (RTO), or the like may, at times, face deadlines to integrate mandated amounts of renewable energy, such as wind or solar energy, for example, into an electricity transmission grid. Integration difficulties may include, for example, unpredictability or intermittency of renewable power, such as changing wind or solar patterns, balancing conventional and renewable energy sources, or the like. This may, for example, produce supply-demand shortfalls or lead to regulation, reliability, or market stability issues, among others.

To address these or other potential issues, information of interest, such as, for example, environment or enterprise-related information or the like may be gathered or acquired in some manner. In some instances, it may be desirable to gather or acquire information from a variety of sources in a variety of formats, for example, so as to broaden or expand an assessment field, analytical or business insights, sector or domain applicability, or the like, as previously mentioned. Information of interest may be gathered or processed in a certain manner and may be used, for example, to provide location-specific, contextually-intelligent, or otherwise tailored approaches so as to reduce imbalances attributed to environmental intermittency, increase predictability of renewable energy production, enhance renewable energy reliability, or the like. In addition, in some instances, it may be desirable to provide a timely analysis so as to facilitate or support, for example, preventive maintenance, condition-based or otherwise, selecting suitable environmental sites for future wind or solar energy farms, or the like. It should be noted, however, that claimed subject matter is not limited to these particular examples, of course.

As was indicated, sampling or processing multi-speed signals originating from a variety of sources in a variety of formats may, however, present a number of challenges. In some instances, challenges may include, for example, increased complexity or processing time, computational or storage cost, requisite processing power, or the like. As a way of illustration, locating or retrieving information to address multi-dimensional or analytical queries having, for example, n-dimensional attributes may typically, although not necessarily, involve performing a number of relatively complex or otherwise time-consuming calculations. For example, at times, processing n-dimensional query attributes may involve Boolean pruning by drilling/rolling operators in connection with distance calculations for multi-dimensional space. By way of example but not limitation, a query may include "How much revenue from greeting cards was generated last Christmas around the San-Francisco Bay Area?" In this illustrated example, "greeting cards" may represent one dimension (e.g., node-related or nodal, etc.), "Christmas" may represent another dimension (e.g., time-related or temporal, etc.), and "San-Francisco" may represent yet another dimension (e.g., location-related or spatial, etc.) within a multi-dimensional relationship characterized by the query. User preferences are typically, although not necessarily, dynamic, meaning that user-specified dimensions may not be known until a query time; thereby, pre-computing or pre-organizing information from potential user preferences may be an expensive task, computationally or storage-wise. Accordingly, it may be desirable to develop one or more methods, systems, or apparatuses that may implement efficient or effective processing or organizing of information so as to at least partially anticipate user preferences, for example, which may facilitate or support faster information analysis, retrieval, reporting, presentation, etc., or any combination thereof. Of course, description of various dimensions is merely an example, and claimed subject matter is not so limited.

FIG. 1 is a flow diagram illustrating a summary of an example process 100 that may be implemented in connection with one or more signal processing techniques including, for example, multi-source signal processing. As seen, multi-source signal processing may be implemented, in whole or in part, using, for example, one or more space-time-node engine-facilitated or supported signal processing operations or techniques. As described below, multi-source signal processing may enhance or improve information organization by utilizing, for example, a space-time-node engine signal structure, which may help in information analysis, retrieval, reporting, presentation, or the like. It should be noted that information acquired or produced, such as, for example, input signals, applications, output signals, operations, results, etc. associated with example process 100 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

As illustrated, at operation 102, one or more signals representative of information of interest may be acquired or sampled from a variety of sources in a variety of formats using one or more signal acquisition devices, schematically represented herein as Sensor 1, Sensor 2, Sensor 3, and so forth up through an Nth Sensor, as referenced generally at 104. As used herein, the term "sensor" is to be interpreted broadly and may refer to any type of a device or system, including a special purpose computing platform, for example, capable of measuring or registering a signal sample value, quantity, phenomenon, condition, state, or like property that may be associated with a signal or signal acquisition point. In some instances, a sensor may, for example, condition or convert an incoming or sampled signal into one or more digital numeric signal sample values for processing or manipulating in some manner by an associated computing platform. Also, at times, a sensor may be capable of communicating a measured or registered signal sample value, quantity, phenomenon, condition, state, etc. to another sensor for further communicating, processing, conditioning, converting, or the like in a suitable or desired manner. By way of example but not limitation, a sensor may comprise any signal acquisition point associated with, for example, an electricity transmission system or grid, Global Positioning System (GPS), supervisory control and data acquisition (SCADA) system, environmental system, BI system, asset or work order management system, etc. as well as various instrumentations associated with structured or unstructured information, such as electronic documents, RSS or Atom feeds, social media platforms or blogs, customer or service systems, smart cards or meters, etc. or any combination thereof. It should be appreciated that a signal acquisition point may also include an embedded reference or hyperlink to images, audio or video files, or other documents. For example, one type of reference that may be embedded in a document and used to identify or locate other documents may comprise a Uniform Resource Locator (URL). As a way of illustration, a signal acquisition point may sample or communicate a signal in connection with a status update, an e-mail, an Extensible Markup Language (XML) document, a web page, a blog, a media file, a page pointed to by a URL, just to name a few examples.

It should be appreciated that in certain implementations one or more signal acquisition devices 104 may comprise, for example, post-signal acquisition devices, meaning that one or more continuous sampled signals, if any, may be momentized in some manner or broken into discrete or finite moments prior to acquisition using appropriate techniques. One or more signal acquisition devices 104 may also feature a time-keeping unit, such as a GPS-enabled atomic clock, for example, to facilitate or support suitable or desired event synchronization, just to illustrate one possible implementation. For example, event synchronization may help to identify when or where a sampled signal was created, processed, acquired, etc., thus, allowing for relatively accurate information acquisition in time, space, or node. In some instances, such as in the absence of a synchronization capability between a source and a recipient, for example, a time or place of signal acquisition may be considered as the time or place of actual event to be analyzed, forecasted, leveraged, reported, or the like.

At operation 106, one or more sampled signals may be processed in some manner by a signal pre-processor 108, for example, to produce a suitable or desired signal input/output form, if desired. For example, one or more sampled signals may be converted, compressed, time-synchronized, or the like so as to reduce or eliminate noise, transmission errors, distribution load, etc. with respect to one or more signal acquisition channels or links associated with devices 104, such as channels or links 110. It should be appreciated that even though one pre-processor 108 is illustrated herein, any number of pre-processors may be utilized to facilitate or support one or more processes at operation 106. It should also be noted that pre-processor 108 may be optional in certain example implementations.

With regard to operation 112, sampled multi-source signals may be collected or aggregated in some manner. As alluded to previously, sampled signals may be communicated from a variety of sources in a variety of formats using any suitable or desired communication protocols, such as, for example, HyperText Transfer Protocol (HTTP), Hypertext Transfer Protocol Secure (HTTPS), Inter-Control Center Communications Protocol (ICCP), User Datagram Protocol (UDP), File Transfer Protocol (FTP), Simple Mail Transfer Protocol (SMTP), etc., or any combination thereof. It should be noted that in certain implementations, such as in implementations where a sequence or chronology of incoming information samples (e.g., packets, etc.), if at all, may be relatively important or otherwise useful, the Internet Protocol Suite, such as, for example, Transmission Control Protocol/Internet Protocol (TCP/IP) or like multi-layer protocol may be employed. Accordingly, to account for particularities of signals originating from a variety of information sources in a variety of formats, example process 100 may include an aggregation or concentration point, realized herein as a signal aggregator or concentrator 114, for example. Signal aggregator 114 may collect, summarize, normalize, de-normalize, etc. incoming multi-source signals to facilitate or support suitable or desired signal processing, such as same or similar signal structure or format recognition, for example, or may perform other formatting or filtering operations, depending, at least in part, on an application. Of course, a description of signal aggregator 114 is merely an example, and claimed subject matter is not so limited.

Having aggregated multi-source signals in a suitable or desired manner, at operation 116, a sampled signal may be partitioned in some manner so as to facilitate or support further processing, such as, for example, processing based, at least in part, on a particular metric or attribute associated with a signal, as will be seen. For example, a sampled signal may be formatted in some manner to arrive at one or more information structures having one or more attributes. In some instances, signal attributes may be stored, at least in part, as signal sample values in associated registers, though claimed subject matter is not so limited. Signal attributes may be representative of one or more characteristics or aspects associated with a sampled signal, such as, for example, spatial, temporal, nodal, communication, security, or like characteristics, or any combination thereof, as will also be seen. In certain implementations, a register may, for example, comprise an 8-bit wide register having signal sample values represented via a byte code indicative of how a particular information structure is to be processed or otherwise may be processed so as to be useful. Particular examples of various information structures, associated attributes, as well as sample register signal values will be described in greater detail below. Register signal values may be assigned to a sampled information structure, formatted or otherwise, using any suitable or desired techniques, such as, for example, by utilizing a function or class-type driver or adapter. An adapter may provide, for example, a suitable or desired interface between different levels or layers of an architecture or a part of an architecture associated with example process 100. In some instances, an adapter may be primarily utilized in connection with a signal acquisition layer, for example, so as to facilitate or support a common format, protocol, or the like, though claimed subject matter is not so limited. An adapter may be written or implemented, in whole or in part, by a vendor associated with a signal acquisition point, such as one or more sensors 104, for example, or by a special purpose computing platform associated with a recipient of a sampled signal, or any combination thereof, as illustrated below. A vendor may comprise, for example, an individual person or entity (e.g., a customer, etc.) that may be capable of participating in one or more operations associated with example process 100 or may benefit, directly or indirectly, from such participation. In some instances, a vendor may provide a suitable level of interoperability between one or more systems, platforms, device, etc. associated with example process 100, such as a source system, a recipient system, a target system, etc., or any combination thereof.

An incoming or sampled signal may be partitioned using any suitable or desired signal decomposition process or technique. For example, a sampled signal may be partitioned by a system of registers for packet decomposition 118 based, at least in part, on one or more attributes associated with the signal. In one implementation, system of registers 118 may comprise a set of digital logic gates, such as digital "OR" gates, for example, implementing a number of logical disjunction operations, though claimed subject matter is not so limited. In some instances, logical operations may be expressed by a truth function utilizing a valuation-type {true, false} logic or operator based, at least in part, on a binary representation of register signal values associated with incoming information structures. For example, a sampled information structure comprising a certain register signal value (e.g., [00001001] or [9], etc.), which may be pre-assigned or otherwise dynamically specified or characterized in some manner, may indicate that the structure includes a payload information and a nodal attribute. Based, at least in part, on this register signal value, a particular operator, such as a {9 OR 8=true} operator, for example, may be triggered or invoked to process an incoming structure accordingly, such as by respective payload and nodal registers. Likewise, if a sample register signal value corresponds to [2], it may be logically determined that an incoming signal may benefit from spatial-type processing, as another possible example. It should be noted that in certain implementations, a relation instead of or in addition to an actual signal sample value (e.g., binary, real, etc.) may be used. For example, a relation may be expressed as a literal like [t=t+1 min] to indicate that a temporal stamp is to be increased by 1 minute, thus, allowing a system to parse an initialization file or read contents accordingly.

Sample register signal values may, for example, be assigned or specified in some manner, such as by a suitable or desired adapter specifying classes or properties to be loaded to run (e.g., programmatically execute, etc.) a particular process or operation. In certain implementations, applicable classes or properties may be written into or otherwise dynamically specified or characterized in some manner in any suitable or desired configuration or initialization-type file. By way of example but not limitation, the way a particular signal may be processed in connection with a certain operation may be specified, at least in part, in a manifest file (e.g., MANIFEST.MF, etc.) or INI-type file (e.g., ".INI", "CFG", ".conf", ".TXT", etc.), though claimed subject matter is not so limited. A particular example of a manifest file that may be utilized in connection with example process 100 may include one illustrated in FIG. 4. Of course, details relating to signal decomposition techniques, register signal values, or manifest classes or properties are merely examples, and claimed subject matter is not limited in this regard. Also, while illustrated in this example as being separate from sensors 104, it should be appreciated that system of registers 118 may be provided as part of a signal acquisition point or, optionally or alternatively, as part of a computing platform or environment associated with a recipient of a sampled signal, such as a space-time-node engine, for example.

At operation 120, one or more training models may be built or applied, for example, so as create one or more trained signal datasets. Trained signal datasets may be advantageously utilized in connection with one or more signal processing layers or platforms, such as analysis, organization, presentation, etc., for example, to facilitate or support more effective or efficient information indexing, analyzing, retrieving, etc., or any combination thereof. As will be seen, training approaches may include, for example, clustering-based training, correlation-based training, evolutionary or genetic algorithm or process-based training, just to name a few examples. In some instances, training may employ one or more stochastic learning techniques, such as regression, clustering, frequency or population distribution, etc. using, at least in part, historical samples, derivatives of historical samples, degree-of-separation models, or the like. In one particular implementation, prior to or concurrently with training, sampled information structures may be pseudo-randomized in some manner, such as via an application of a Brownian motion-type process, for example, to obtain one or more statistically suitable sample sets of signal data or information points.

As will also be seen, information points may, for example, be descriptive of one or more dominant attributes associated with sampled signals and may help to assess or learn relationships, strengths of relationships, or lack thereof across information structures of interest. In certain implementations, one or more dominant attributes of sampled signals may, for example, be determined based, at least in part, on an application of a dominance principle. As used herein "dominance principle" may refer to a process or technique of determining a degree of cardinality with respect to one or more attributes of one or more information structures associated with one or more sampled signals. By way of example but not limitation, one or more dominant attributes may comprise, for example, spatially, temporally, or nodally-dominated value-based metrics that may influence one or more characteristics of sampled signals and, as such, may affect signal processing, organizing, storing, or the like. Particular examples of an application of a dominance principle will be described in greater detail below with reference to FIG. 5.

With respect to operation 122, information structures representative of various sampled signals acquired or obtained from a variety of sources in a variety of formats may be organized in some manner so as to allow, for example, for more effective or efficient information accessing, analyzing, retrieving, etc., or any combination thereof. For example, information structures reflecting possible or potential preferences (e.g., user preferences, etc.) in connection with providing analytics or addressing multi-dimensional analytical queries, among other approaches, may be organized as a function of proximity or mutually relative distance in a linearized in-memory array in at least one embodiment. This may facilitate or support faster information accessing, retrieving, presentation, etc., or any combination thereof, as previously mentioned. More specifically, in an implementation, multi-dimensional aspects of sampled signals may be represented, for example, via a number of n-dimensional signal vectors that may be mapped or transformed to, or otherwise conditioned in some manner for a two-dimensional space, as an example embodiment. Subsequently, sample signal values may be linearized based, at least in part, on distance by performing a memory sweep with respect to one or more dominant attributes of a sampled signal identified or determined, for example, in accordance with a dominance principle. Accordingly, based, at least in part, on space-time-node-facilitated or supported signal processing, information structures may be intelligently organized so as to comprise, for example, a space-time-node engine signal structure, as previously mentioned. Particular examples of one or more operations in connection with a memory sweep will be described in greater detail below. In addition, although not shown, at operation 122, information structures may be communicated to one or more high-speed computing clusters or massive storage entities, such as general-purpose graphics processing units (GP-GPU), MapReduce clusters, or the like. Of course, details relating to linearization, memory sweep, or possible approaches are merely examples, and claimed subject matter is not so limited.

At operation 124, results with respect to information of interest, such as trend analysis, performance management, market research, situational awareness, supply-demand economics, or the like may be presented in a suitable or desired visual representation form. For example, information of interest obtained from a variety of sources in a variety of formats may be correlated in some manner to provide an ergonomic or easy-to-use interface experience in the form of an analytical tool or framework helping to visualize various spatio-temporal-nodal relationships. In some instances, results may be provided so as to visually represent certain spatio-temporal-nodal relationships in a manner that may facilitate or support deriving or drawing particular inferences, conclusions, or the like that may assessed, in whole or in part, in connection with such a relationship, just to illustrate one possible implementation. By way of example but not limitation, various map-based interfaces, such as geo-spatial flow charts or diagrams, dashboard-based presentations, or like may be employed in connection with operation 124. Of course, claimed subject matter is not limited to these presentation techniques.

Accordingly, in certain implementations, example process 100 may be conceptually represented as comprising, for example, a number of space-time-node engine-facilitated or supported signal processing layers, which may correlate with or correspond to one or more operations described above, such as signal information acquisition layer 126, training or preparation layer 128, internal organization layer 130, or result presentation layer 132. Of course, details relating to various layers, layer sequences, as well as the number of layers shown in connection with example process 100 are merely examples, and claimed subject matter is not limited in this regard.

Figure 2:
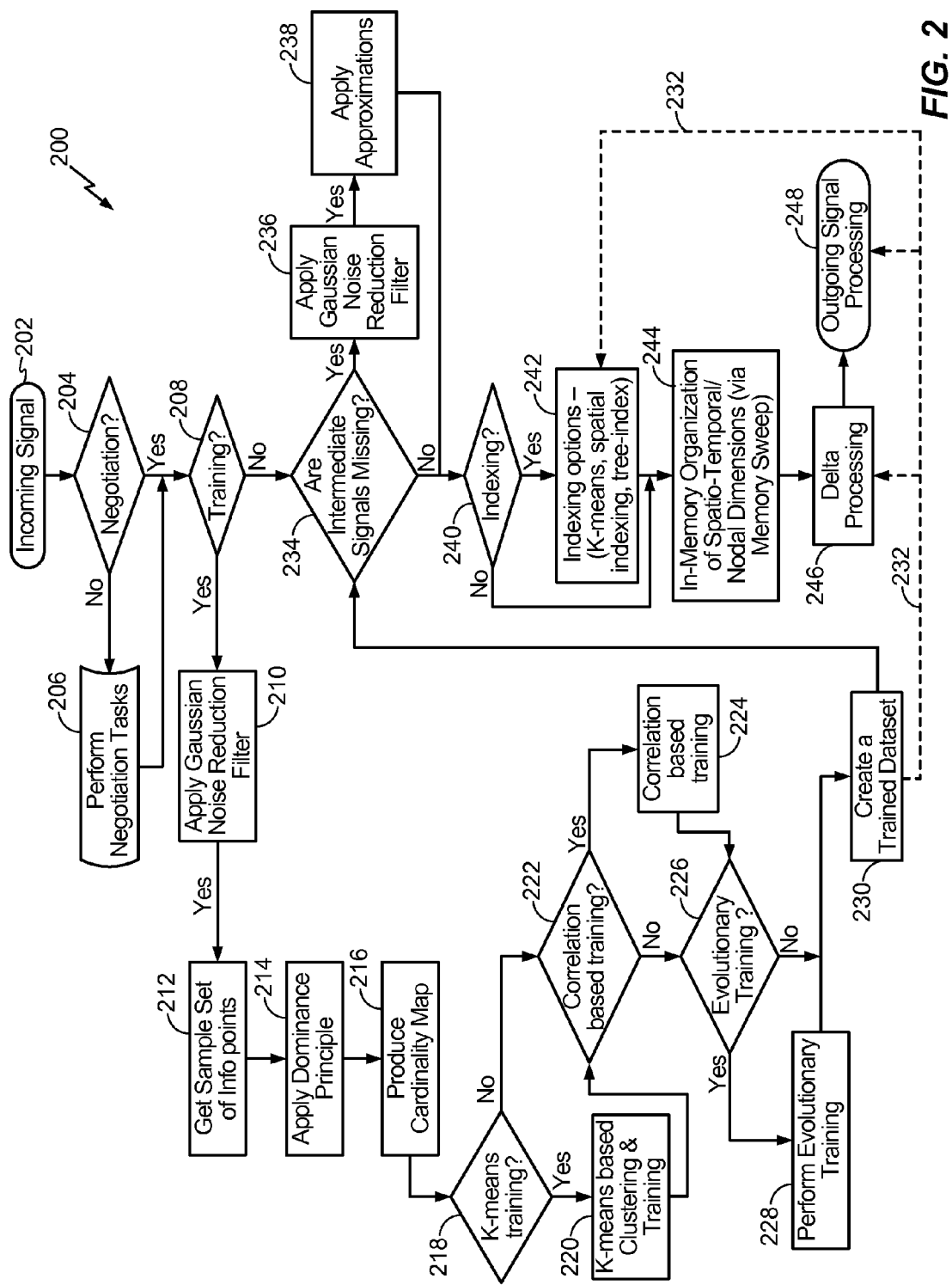
FIG. 2 is a flow diagram of an example process for performing multi-source signal processing in connection with a space-time-node engine signal structure.

With this in mind, attention is now drawn to FIG. 2, which comprises a flow diagram of an example process 200 that may be implemented, in whole or in part, in connection with a space-time-node engine signal structure. Again, it should be appreciated that even though one or more operations are illustrated or described with respect to a certain sequence, other sequences including, for example, concurrent operations may also be employed. In addition, although the description below references particular aspects or features illustrated in certain other figures, such as FIG. 1, 7, or 9, for example, one or more operations may be performed with other aspects or features.

As illustrated, example process 200 may begin at operation 202 with sampling or acquiring one or more digital signals representative of information originating from a variety of sources in a variety of formats. As previously mentioned, sampled signals may be momentized or broken into discrete or finite moments prior to acquisition using appropriate techniques. As will be seen, momentized signals may be characterized by a number of n-dimensional signal vectors that may be used, at least in part, to determine a cardinality of one or more dominant attributes associated with the signals. As was also indicated, a sampled signal may be formatted in some manner, such as by utilizing a function or class-type driver or adapter, for example, to facilitate or support a certain type of formatting, such as a space-time-nodal-type formatting, though claimed subject matter is not so limited. In certain implementations, such an adapter may comprise, for example, a space-time-nodal adapter, and an information structure may comprise, for example, a space-time-nodal grain (STING).

Figure 15:
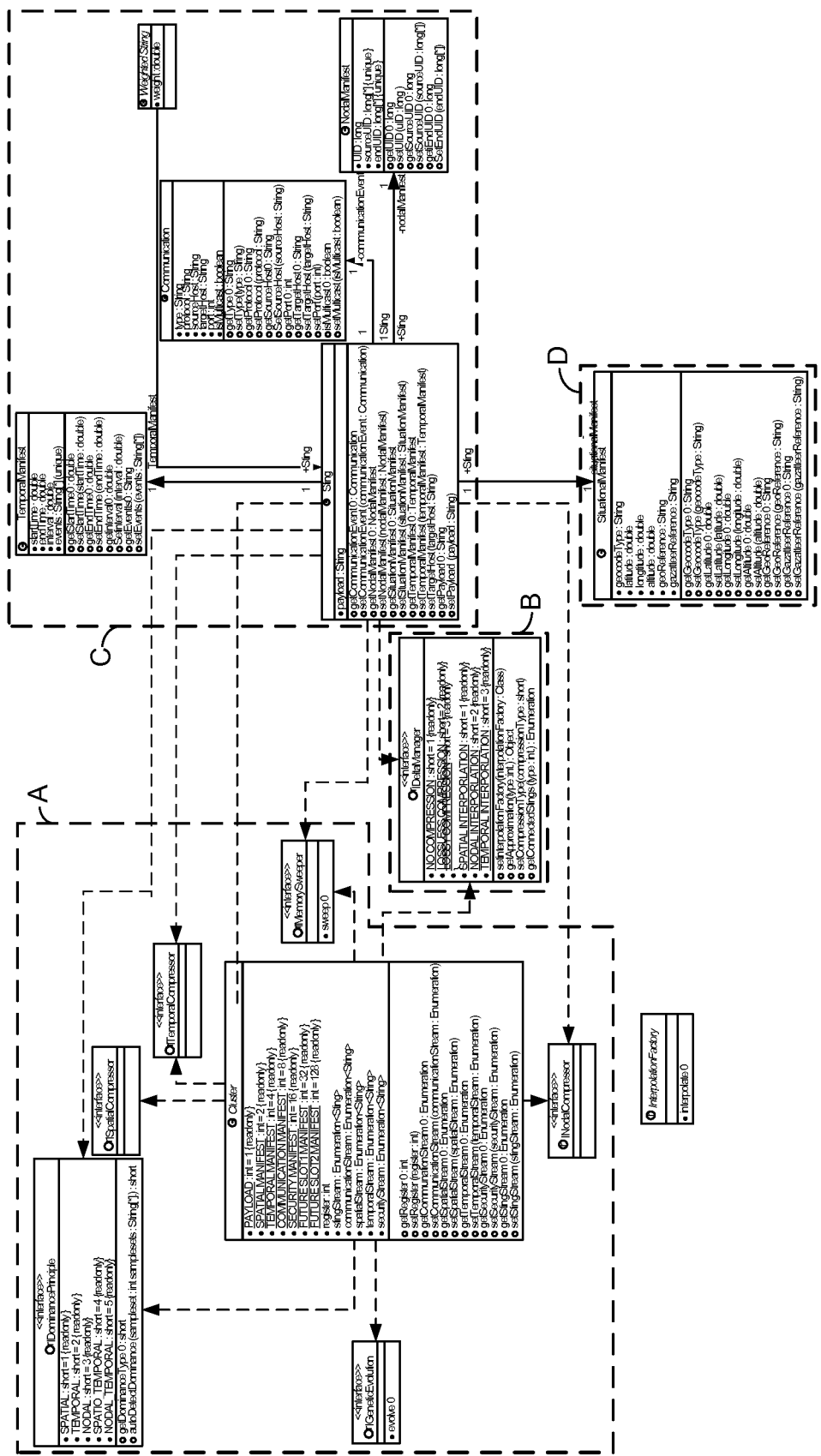
FIG. 15 is a schematic representation of an implementation of an example class or UML-type diagram.
Figure 15A:
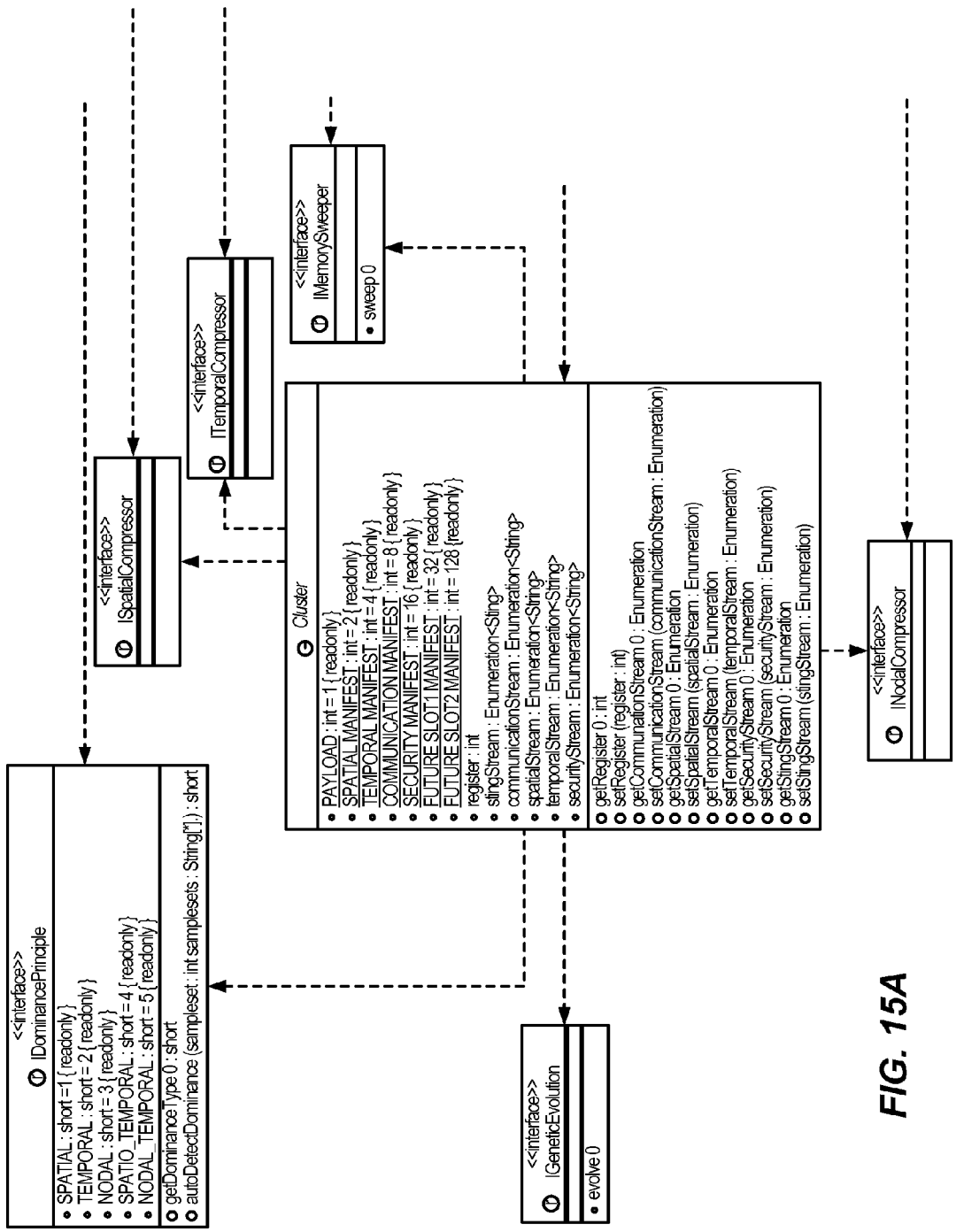
FIGS. 15A, 15B, 15C, and 15D are respective enlarged areas A, B, C, and D of the diagram of FIG. 15.
Figure 15B:
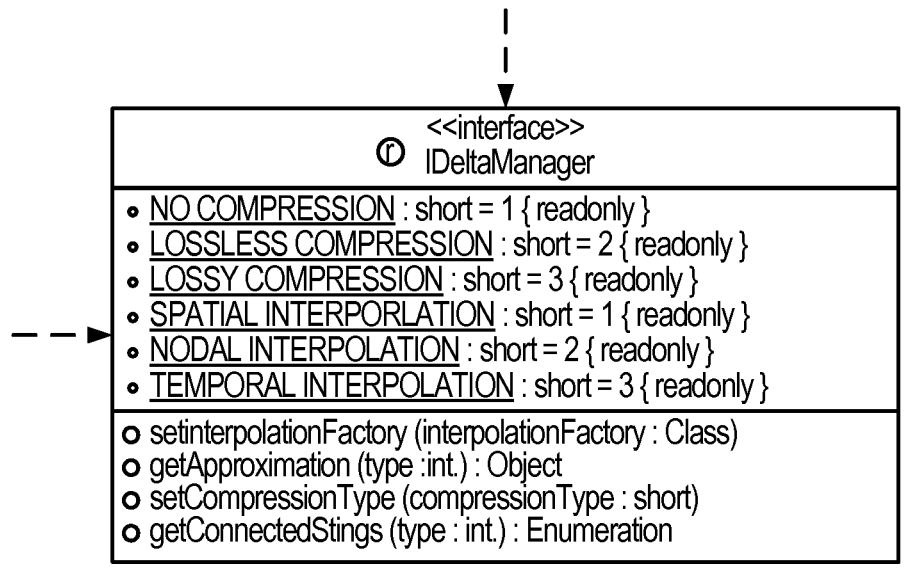
Figure 15D:
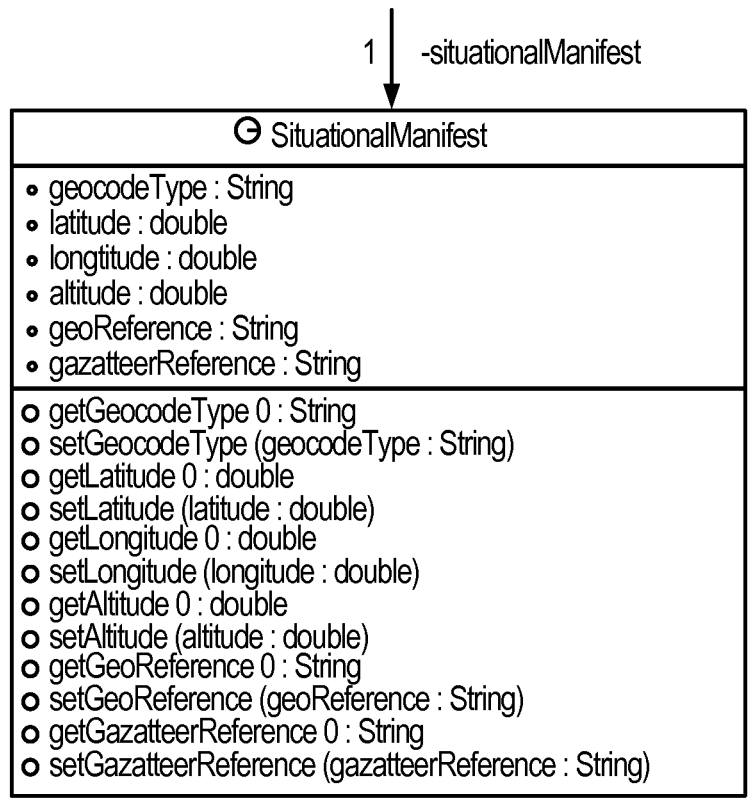
Figure 15C:
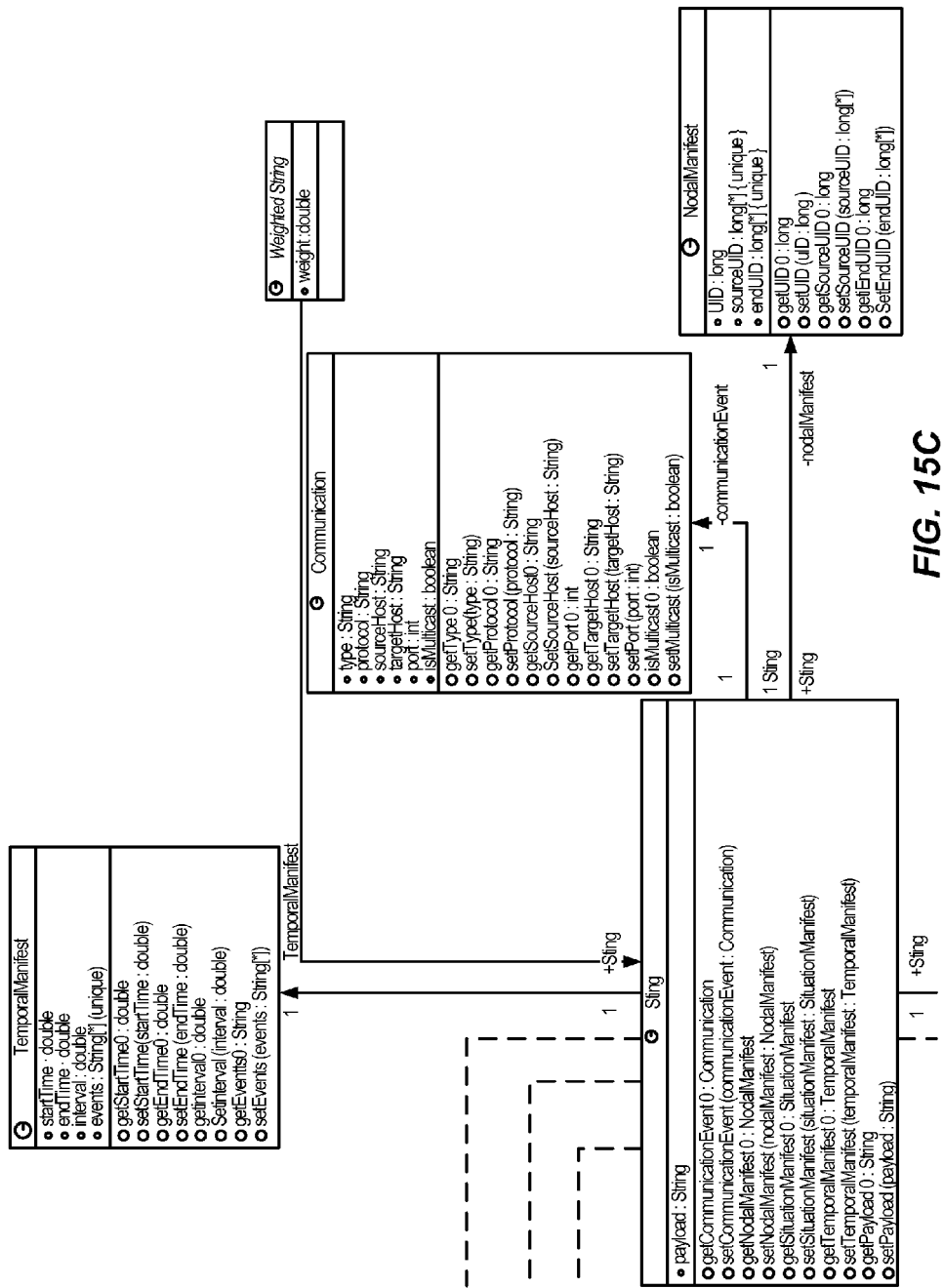

As previously mentioned, a STING adapter may be implemented, in whole or in part, by a vendor associated with a signal acquisition point utilizing a class or Unified Modeling Language (UML) type diagram that may be made available. Optionally or alternatively, a STING adapter may be implemented, for example, by a special purpose computing platform associated with a recipient of a sampled signal, such as a space-time-node engine. For this example, various classes or properties may be statically or dynamically specified or characterized in some manner, such as via an ecosystem file created by an ecosystem configuration manager. More specifically, a designer-type entity, such as an ecosystem designer, for example, which may or may not be associated with a recipient of a sampled signal (e.g., a space-time-node engine, etc.) may define or characterize via an applicable ecosystem file one or more types of sources or attributes that may be used or supported, business objects or artifacts that may be formatted, constraints or indexing strategies that may be considered, etc., or any combination thereof. Claimed subject matter is not so limited, of course. For example, a STING adapter may comprise a product of collaboration between any suitable parties associated with a source or recipient of a sampled signal, for example, or any suitable third party, depending, at least in part, on implementation. By way of example but not limitation, a class or UML-type diagram that may be utilized, in whole or in part, in connection with a space-time-nodal-type formatting may include an example as illustrated in FIG. 15. It should be appreciated that one or more classes, properties, attributes, relationships, etc. shown are merely examples to which claimed subject matter is not limited.

Figure 3A:
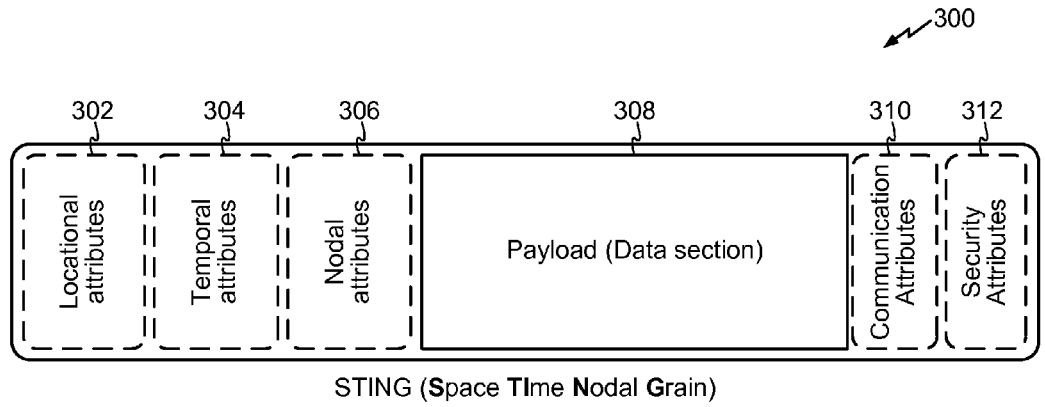
FIG. 3A is schematic illustration of an implementation of an example information structure in a space-time-nodal grain (STING) format.

Turning now to FIG. 3A, a schematic illustration of an implementation of an example information structure 300 in a space-time-nodal grain or STING format is shown. In this context, "STING," "STING cell," STING signal structure," or the plural form of such terms may be used interchangeably and may refer to an information structure comprising one or more attributes related to or associated with a sampled signal. In one particular implementation, an information structure, such as STING cell 300, for example, may be conceptually represented as comprising a number of stores or sections with signal-related aspects or attributes. As illustrated, STING cell 300 may comprise, for example, spatial or locational attributes 302, temporal attributes 304, nodal attributes 306, payload or information section 308, communication attributes 310, or security attributes 312. It should be appreciated that even though a certain number or types of signal-related aspects or attributes are illustrated herein, any number or type of signal-related aspects or attributes may comprise STING cell 300.

For this example, spatial or locational attributes 302 may represent one or more space or location-related characteristics associated with a sampled signal. In some instances, spatial attributes may include, for example, one or more latitude or longitude signal sample values identifying a source or origin of a sampled signal, a geo-coded reference or literal descriptive of a signal acquisition point or source, or the like. One possible format for a geo-coded reference may include, for example, "Fremont, Calif., 94555," and an example of a literal may comprise a geo-hash like "9q8yyk8yuv5xw." In an implementation where a literal may be used to spatially annotate an information structure, such as STING cell 300, for example, a pre-negotiation operation between a sender of a signal and its recipient may establish a geocode factory using appropriate techniques, for example, so as to obtain source-related geographic coordinates. One possible example of a geocode factory may include, for example, a gazetteer service, though claimed subject matter is not so limited, of course. Geocode factories are known and need not be described here in greater detail.

Temporal attributes 304 may comprise, for example, one or more time-related characteristics associated with a sampled signal. For example, temporal attributes 304 may comprise a time stamp denoting a time, date, etc. at which a signal was created, which may typically, although not necessarily, be in the form of a range. Here, a temporal attributes 304 may be relatively fine-grained, meaning that associated sample signal values may support, for example, up to a microsecond granularity, though claimed subject matter is not so limited. As previously mentioned, a source and a recipient of a sampled signal, such as a space-time-node engine, for example, may utilize atomic clocks to facilitate or support time-related synchronization to eliminate or reduce sampling ambiguity. In one particular implementation, a source and a recipient may feature GPS-enabled clocks capable of maintaining, for example, microsecond-level synchronization, at least approximately.

Nodal attributes 306 may comprise, for example, one or more node-related characteristics associated with a sampled signal. For example, nodal attributes 306 may comprise one or more signal sample values descriptive of a relationship that is typically, although not necessarily, relational rather than dimensional. By way of example but not limitation, a nodal relationship may comprise, for example, a sociogram or graph-type relationship. Accordingly, nodal attributes 306 may describe or identify a particular node in a graph associated with a sampled signal. For purposes of explanation, a nodal relationship between information sources of interest may be conceptualized, for example, via an analytical query like "How many greeting cards were sold by Hallmark Cards, Inc. stores in San Francisco and San Jose?" For this example, different Hallmark stores in San Francisco and San Jose may represent different nodes in a linked relationship (e.g., Hallmark stores, etc.) that may be advantageously captured by an information structure, such as STING cell 300, for example. Nodal attributes 306 may comprise, for example, a signal sample value identifying a particular node (e.g., a particular store in San Francisco, etc.) in an interlinked hierarchy of nodes (e.g., different Hallmark stores in different cities, etc.) associated with a sampled signal. Of course, details relating to particular nodes are merely examples, and claimed subject matter is not so limited.

Payload 308 may comprise, for example, one or more signal sample values representing information of interest, such as information to be analyzed, visualized, forecasted, leveraged, etc. or any combination thereof, associated with a signal acquisition point or source. As previously mentioned, payload 308 may include, for example, various performance, market, management, operations, business-related information, or the like.

Communication attributes 310 may comprise, for example, one or more signal sample values representative of communication or network-related aspects of a sampled signal. For example, communication attributes 310 may be descriptive of an underlying communication infrastructure associated with a signal acquisition point, may provide source or destination addresses, bandwidth, latency, error detection checksums, transmission loss, channel noise, sequencing information, or the like.

Security attributes 312 may comprise, for example, one or more signal sample values representative of security-related aspects associated with a sampled signal. For example, security attributes 312 may be descriptive of sensitive or personal information with respect to a signal acquisition point, such as an identity of a source, source or signal ownership information, whether information is to be protected, access privileges, or the like. In other words, security attributes 312 may facilitate or support protection of information associated with an information structure, such as STING cell 300, for example, from unauthorized access, use, disclosure, modification, interception, destruction, or the like.

As was indicated, one or more attributes associated with STING cell 300 may be optional in certain example implementations, which may depend, at least in part, on a signal acquisition point or source. As a way of illustration, if a source of a sampled signal is associated with a navigation or positioning system, such as a GPS device that may change its location sporadically, frequently, or periodically, a STING cell may omit a nodal attribute to comprise, for example, a spatial or temporal attribute, among others (e.g., a payload, security, etc.). Likewise, as an example, a signal acquisition point realized as a thermostat may be useful for sampling information with respect to space or time, for example, but less useful with respect to node-related attributes since thermostats are typically, although not necessarily, stationary devices. As another possible example, since typically, although not necessarily, there is no spatial dimension with respect to a signal acquisition point associated with a BI system, for example, locational or spatial attributes of a STING cell may be omitted, depending, at least in part, on an embodiment.

Figure 3B:
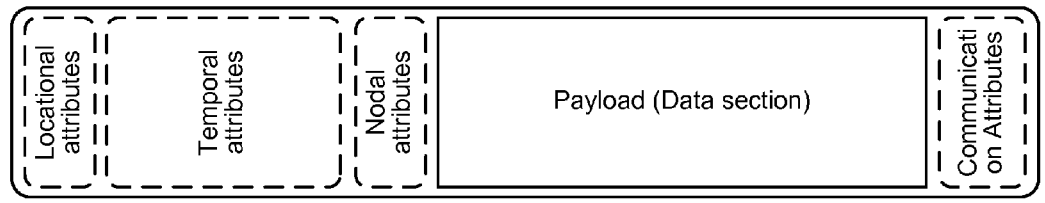
FIG. 3B is schematic illustration of an implementation of an example information structure in a STING format having one or more dominant attributes.
Figure 3B:
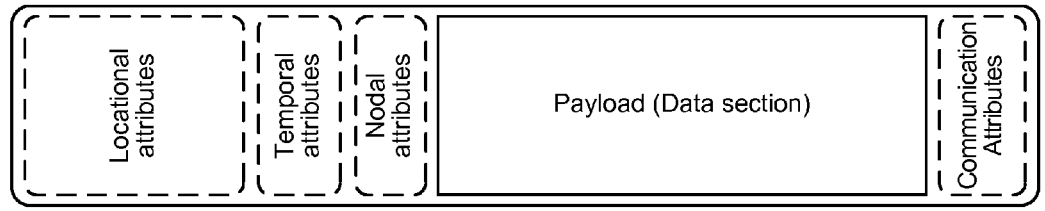
Figure 3B:
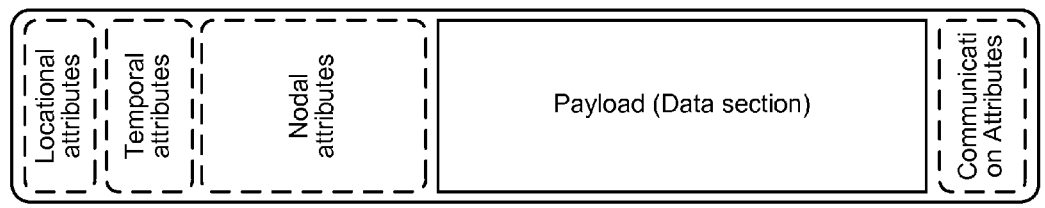

In addition, as will be described in greater detail below, such as in connection with an application of a dominance principle, for example, one or more attributes associated with a STING cell may dominate over one or more other one or more attributes. Dominant attributes of sampled signals may, for example, be dependent upon or attributable to, at least in part, a rate of change in a payload of a sampled signal with respect to time, space, or node, as will be seen. Accordingly, size or so-called granularity of a store or section (e.g., temporal, nodal, spatial, etc.) associated with a STING cell may be adjusted in some manner. By way of example but not limitation, for slower-moving signals, such as GPS-type signals, for example, at times, a nodal attribute may be less useful than, for example, one or more spatial or temporal attributes, as indicated above. As such, GPS-related STING cells may omit nodal attributes to continually communicate spatial or temporal attributes (or both), in which case, granularity of a nodal store or section may be increased to reflect one or more dominant attributes. As another example, higher-speed signals, such as a fast Fourier transform (FFT) of an alternating current (AC) signal, for example, may exhibit temporal dominance, thus, reserving or allocating higher granularity for a store or section with time-related characteristics. Examples of STING cells having one or more dominant attributes are illustrated in FIG. 3B. As seen, stores or sections with a higher number of bytes may be reserved for or allocated towards a particular dominant attribute, if any, as schematically represented via a larger area of a section or store. Of course, details relating to one or more dominant attributes are merely examples and claimed subject matter is not so limited. In addition, although not shown, STING cells of FIG. 3B may comprise other signal-related attributes, such as security attributes, for example.

In an implementation, sampled STING cells may be linked in some manner so as to facilitate or support more efficient or effective processing of a continual signal stream of STING cells. For example, STING cells may be committed to one or more STING clusters based, at least in part, on a payload-to-byte ratio, average number of STING cells per payload, or the like. Any suitable or desired format may be utilized. As a way of illustration, a STING cluster may be formatted, for example, as an information or signal data string (e.g., coma-separated, etc.) in connection with an Extensible Markup Language (XML) document, or the like, depending, at least in part, on an implementation. By way of example but not limitation, one possible format suitable for commitment of STING cells to a cluster may comprise an example represented in Table 1 below. Consider, for example:

TABLE 1

Example STING cluster format.

Data stream -> y = x^2; t = t + 1;
{[2], 67.0009,−117.67,[4] 7.00am, [1]
{65,OFF,80%},{67,OFF,77%},{68,OFF,75%},{69,OFF,74%},
{70,OFF,78%},{71,OFF,80%},{72,OFF,82%},{72,ON,45%},
{73,ON,43%}, 117.14.56.34 , 67kb/sec}
+
{[2], 67.0009,−117.67,[4] 7.00am, [1]
{65,OFF,80%},{67,OFF,77%},{68,OFF,75%},{69,OFF,74%},
{70,OFF,78%},{71,OFF,80%},{72,OFF,82%},{72,ON,45%},
{73,ON,43%}, 117.14.56.34 , 67kb/sec}
+
{[2], 67.0009,−117.67,[4] 7.00am, [1]
{65,OFF,80%},{67,OFF,77%},{68,OFF,75%},{69,OFF,74%},
{70,OFF,78%},{71,OFF,80%}{72,OFF,82%},{72,ON,45%},
{73,ON,43%}, 117.14.56.34 , 67kb/sec}

As seen, a suitable format may comprise, for example, a string of STING cells clustered via a "+" notation, wherein a string may comprise one or more signal sample values acquired or sampled in connection with a signal acquisition point. For purposes of illustration, a signal acquisition point may be realized as a thermostat, though claimed subject matter is not so limited. For example, a STING cell may comprise a spatial attribute characterized via a register signal value [2] with latitude-longitude signal values of 67.0009, −117.67, a temporal attribute characterized via a register signal value [4] of 7.00 am, a payload characterized via a register signal value [1] represented as a string of signal values with respect to a temperature (e.g., 65, etc.), operating state (e.g., OFF, etc.), or energy efficiency (e.g., 77%, etc.) of a thermostat, or:

{65,OFF,80%},{67,OFF,77%},{68,OFF,75%},{69,OFF,74%},{70,OFF,78%} and a communication attribute comprising an IP address (e.g., 117.14.56.34, etc.) and an information transfer rate (e.g., 67 kb/sec, etc.).

As previously mentioned, instead of a signal value (e.g., binary, real, etc.) to indicate a type of processing to be applied (e.g., spatial, temporal, etc.), such as, for example, at operation 116 of FIG. 1, a format may reference a relation, such as a parabolic trajectory formulation $y=x^2$. This or other suitable relations may be utilized, at least in part, in instances where aspects of an incoming signal are sufficiently predictable, such as signal deviations associated with a sine wave of an AC, for example, which may be captured by an appropriate relation. If a sampled signal is sufficiently predictable, a relation may be used instead of or in addition to signal sample values, thus, eliminating or reducing sampling a signal stream of STING cells in a continual fashion. This may provide benefits in terms of reducing a processing time or complexity, improving performance, etc., or any combination thereof.

In addition, a script, such as, for example, <1++> may also be utilized to indicate a suitable processing increment in connection with sampling a signal, as illustrated. A script may be useful for processing temporal attributes, for example, so as to invoke or trigger processing in accordance with time increments, such as 1, 2, 3, etc. seconds, minutes, etc., as was also indicated. To illustrate, a temporal attribute, such as time stamp, for example, may be increased by 1 second, minute, etc. based, at least in part, on a [t=t+1_] formulation that may be specified for an information stream. Accordingly, instead of or in addition to {1997-07-16T19:20+01:00} notation, other formats may also be considered: {1997-07-16T19:<1++>+01:00}.

Figure 4:
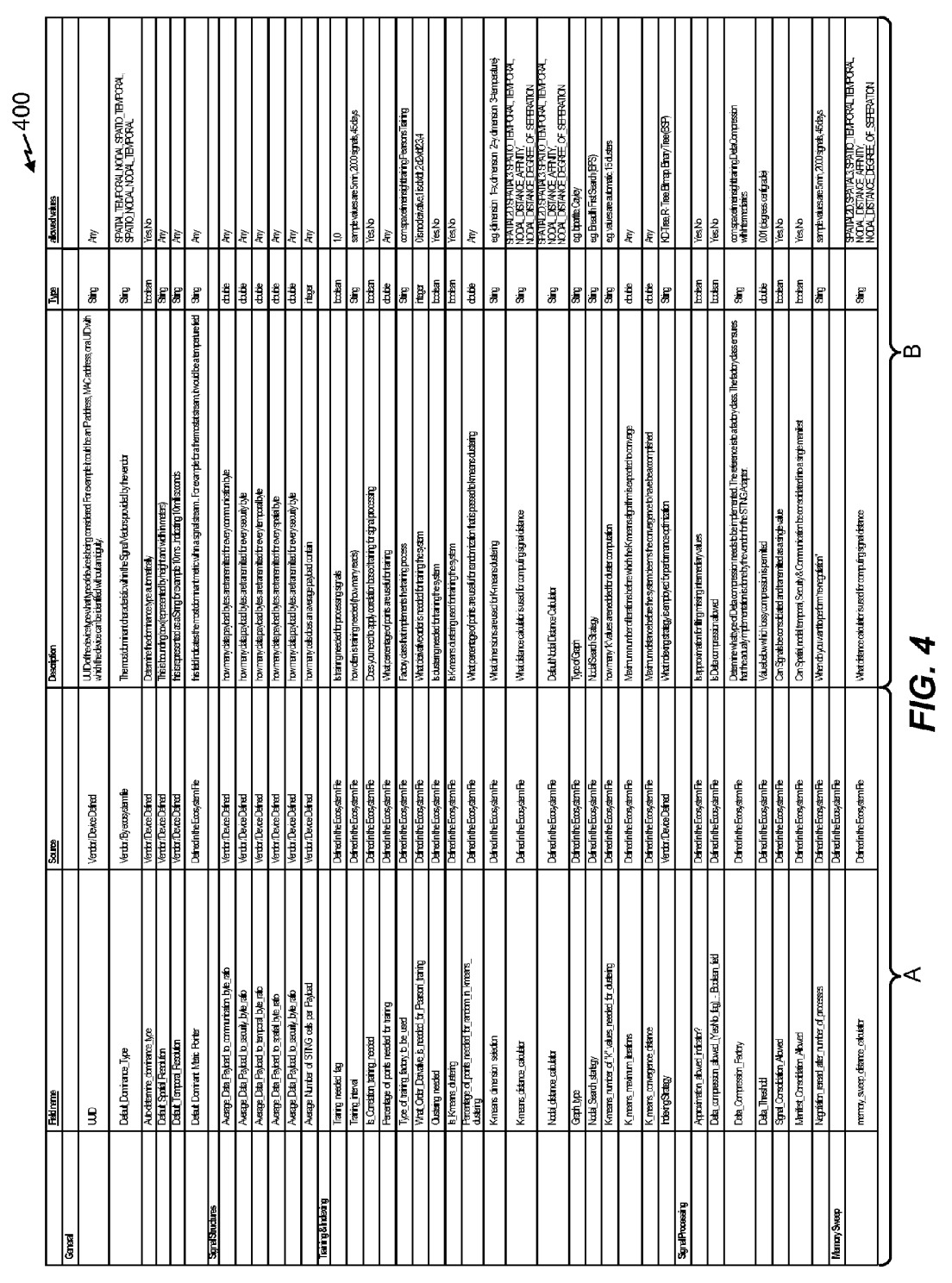

As mentioned above, size of a STING cluster may be characterized, at least in part, in a manifest file by specifying, for example, a payload-to-byte ratio of sampled STING cells, just to illustrate one possible implementation. FIG. 4 illustrates an example manifest file 400 that may be utilized or otherwise considered, in whole or in part, in connection with one or more operations associated with example process 200. It should be appreciated that manifest file 400, which is self-explanatory, is provided herein by way of a non-limiting example and may comprise, for example, information specifying or characterizing one or more classes, extensions, packages, etc., or any combination thereof. Briefly, in this illustrated example, manifest file 400 may comprise a number of field name entrances which may be referenced to facilitate or support one or more operations with respect to signal structures, training, indexing, processing, or the like. For purposes of explanation, one or more classes, extensions, packages, etc. may be specified in some manner, such as by a vendor, device, ecosystem configuration manager (e.g., in the ecosystem file, etc.), or any combination thereof, as previously mentioned. In addition, manifest file 400 may specify a type or format that may be used in connection with one or more operations, description of corresponding functions, types of signal characteristics that may be supported, as well as signal values that may be allowed for respective processing, which may, of course, depend, at least in part, on a particular application. In one implementation, a payload-to-byte ratio of 400:10 or 40 may be used, such that a STING cluster would be created if a ratio has been quantified or otherwise observed, for example. Of course, descriptions relating to payload-to-byte ratios or manifest file are merely examples, and claimed subject matter is not limited in this regard.

Referring back to FIG. 2, at operation 204, it may be determined whether negotiation between a signal acquisition point or source and a recipient of a sampled signal is appropriate. Typically, although not necessarily, negotiation may comprise a process in which a computing platform associated with a source, for example, may inform or negotiate with a computing platform of a recipient on processing of one or more attributes of an incoming or sampled signal, such as one or more attributes discussed above in connection with FIG. 3A. If it is determined that negotiation is appropriate, at operation 206, one or more negotiation tasks may be performed. For example, a source may negotiate with a recipient using applicable terms of negotiation by referencing any suitable file supporting a negotiation-related process, such as manifest file 400 of FIG. 4, for example. Negotiation-related fields may correspond or be mapped in some manner to a Universal Unique Identifier (UUID) embedded in an information structure, such as STING cell 300, for example, so as to identify a structure. By way of example but not limitation, terms of negotiation may include those listed in negotiation-related fields in manifest 400, though claimed subject matter is not so limited. Source-recipient negotiation techniques are generally known and need not be described here in greater detail.

At operation 208, a determination may be made regarding whether one or more sampled STING cells are to be trained. As described below, based, at least in part, on training, one or more trained signal datasets may be created and subsequently applied to facilitate or support more effective or efficient information indexing, organization, processing, visualization, reporting, or the like. In an implementation, whether training is appropriate may be determined, at least in part, by referencing training-related fields, for example, in a manifest file, such as manifest file 400. As was alluded to previously, training-related fields may be specified by a vendor associated with a signal acquisition point or source, for example, or otherwise dynamically specified or characterized in some manner (e.g., by an ecosystem configuration manager, etc.). If it is determined that training is appropriate or otherwise may be useful, example process 200 may continue to operation 210. On the other hand, if training is omitted, a process may proceed to operation 234.

Figure 6:
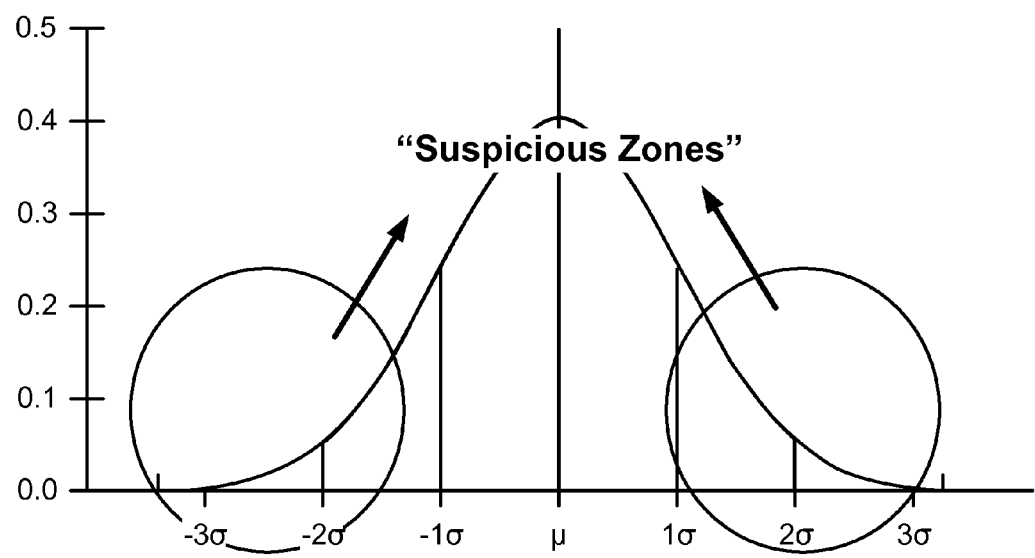
FIG. 6 illustrates an implementation of an example application of a Gaussian filter.

With regard to operation 210, a Gaussian filter may be applied in some manner to a sampled stream of STING cells so as to reduce or eliminate noise by attenuating, removing, or otherwise ignoring, for example, one or more STING cells with spurious sample signal values representative of incorrect or corrupted signals, for example. As previously mentioned, a sampled signal may be represented as:

$$S_i = \{x_i, y_i, z_i, t_i, N_i, v1_i, v2_i \ldots\}$$

where $v1_i$, $v2_i$ denote value vectors, and i is a whole number. Signal sample value vectors may account for properties of a sampled signal associated with a signal acquisition point or source and may comprise, for example, signal sample values representative of temperature, pressure, etc., or any combination thereof. To reduce or eliminate noise, a Gaussian filter may be applied such that signal sample values with certain standard deviations (e.g., variations from average signal sample values) may be considered as noise or error and, as such, may be eliminated, cut-off, or attenuated. More specifically, for a signal value vector, standard deviations $\sigma_i$ may be computed as:

$$\sigma_1 = \sqrt{\frac{1}{n}\sum_{i=1}^{n}(v1_i - \mu_1)^2} \quad (1)$$

$$\sigma_2 = \sqrt{\frac{1}{n}\sum_{i=1}^{n}(v2_i - \mu_2)^2}$$

where $\mu_1$ and $\mu_2$ denote respective means or averages. By way of example but not limitation, in certain simulation or experiments, a standard deviation value of 3 or higher was used as a cut-off threshold and may prove beneficial in reducing or eliminating spurious values of a sampled signal. Accordingly, as seen in FIG. 6, signal sample values behind "suspicious zones" may be considered as noise or error and may be cut-off, attenuated, or otherwise ignored. Of course, this is merely an example of a threshold that may be used in connection with an application of a Gaussian filter, and claimed subject matter is not so limited.

At operation 212, one or more sample sets of information points may be obtained or extracted for training. It should be noted that any suitable extraction techniques may be employed. In some instances, extraction techniques may, for example, depend, at least in part, on a manner of how STING cells may be organized, stored, processed, etc., or any combination thereof. For example, in one implementation, a sample set may be extracted via a pseudo-randomization technique, though claimed subject matter is not so limited. A stream of STING cells may be directed into any suitable in-memory appliance, such as a database, file memory system, or like information repository, for example, and may be stored as one or more sets of STING clusters, such as one or more STING clusters illustrated in Table 1 above. A number of points that may be extracted may depend, at least in part, on a total number of available signal structures, such as, for example, STING cells in a cluster. In some instances, a number of pseudo-random points useful for training may, for example, be specified or characterized in a manifest file as a percentage of a total sample set. For example, based, at least in part, on a total number of rows in a particular STING cluster, a number of sample information points in a set may be computed by dividing a percentage of points available for training by a number of rows in a cluster. By way of example but not limitation, if there are 10 million in-memory rows, 5% of a total sample set may indicate that 500,000 rows may be utilized for training. In one implementation, a database extraction technique via pseudo-randomization may be performed by way of a SELECT statement executed against a sample set stored in a database, such that:
SELECT TOP 10000 UUID, NewID( ) as Random FROM STING CLUSTER ORDER BY Random
Accordingly, as an illustrated example, 10,000 random STING cells would be extracted for training. Of course, this is merely one possible example. Many extraction techniques other than pseudo-randomization may also be utilized in connection with operation 212.

With regard to operation 214, a dominance principle may be applied in some manner to a set of STING cells representative of a sampled signal. As previously mentioned, a dominance principle may refer to a process of determining a degree of cardinality with respect to one or more attributes associated with one or more sampled STING cells. In some instances, a dominance principle may be applied, for example, to understand the nature or relationships between various incoming information structures associated with sampled signals. In one implementation, a dominance principle may be applied, for example, to determine which one or more attributes among a number of attributes associated with sampled STING cells, such as attributes discussed above in connection with FIG. 3A, for example, may be dominant.

Figures 5, 13:
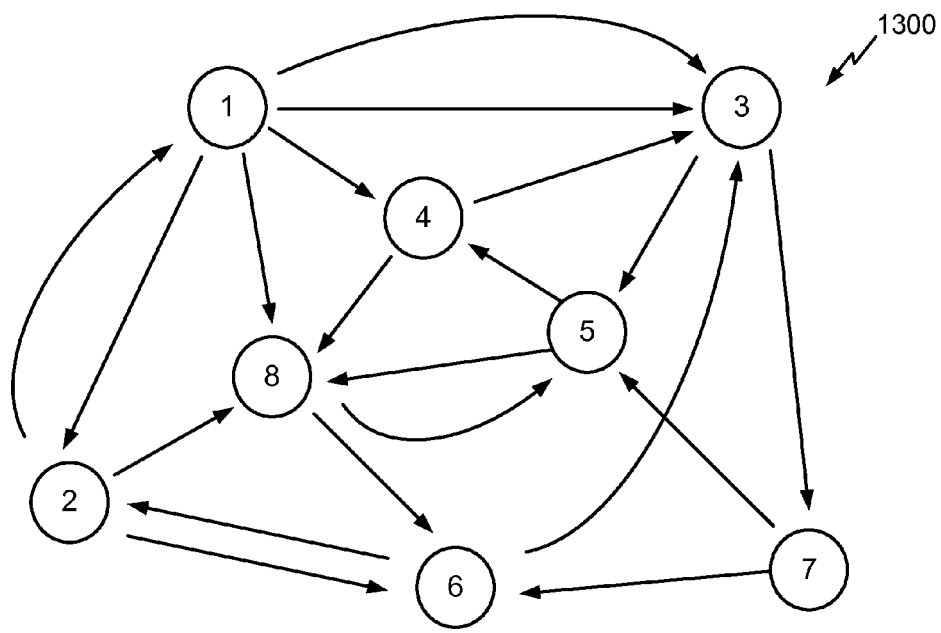
FIG. 5 illustrates an implementation of an example application of a dominance principle.
FIG. 13 illustrates an implementation of an example graph.

Attention is now drawn to FIG. 5, illustrating an implementation of an example application of a dominance principle. As previously mentioned, an incoming stream of STING cells representative of a sampled signal may be momentized, for example, into a number of n-dimensional signal vectors. For an example implementation, momentized signal vectors may comprise, for example, signal vectors S1 through S7, as illustrated generally at 502. As seen, a signal vector may be specified, for example, by a number of dimensions or planes, indicated generally at 504, corresponding to one or more attributes associated with a sampled signal. For example, X, Y, and Z dimensions may correspond to locational or spatial attributes, such as latitude, longitude, and altitude, respectively; T dimension may correspond to temporal or time-related attributes; and N dimension may correspond to nodal attributes. As previously mentioned, a nodal relationship may typically, although not necessarily, comprise relational features rather than dimensional features, meaning that a nodal relationship may be plotted or represented graphically, for example, as a sociogram or graph-type relationship. Nodal attributes, thus, may be specified or characterized, for example, in connection with a nodal domain, such as nodal domain N, rather than a nodal dimension. However, it should be noted that in this context the term "nodal dimension" may be used interchangeably with the term "nodal domain" so as to provide similar meaning. In an example, a momentized sampled signal may be represented via a number of n-dimensional vectors $S(n)=\{X, Y, Z, T, N\}$. It should be noted that Z or an altitude dimension may be optional in some example implementations. Of course, these are merely examples of various signal vectors, dimensions, or attributes that may be utilized in connection with an application of a dominance principle, and claimed subject matter is not so limited.

It may be observed that for S1, S2, and S3 signal vectors, X, Y, Z, and N dimension or plane-related moments may not change or may change little. On the other hand, T plane-related moments may change from t1 to t10, which may indicate that one or more time-related attributes of one or more STING cells may dominate or exhibit a higher degree of cardinality. Typically, although not necessarily, a cardinality of a set may refer to a measure of a number of elements of a set. For purposes of explanation, a set $A=\{2, 4, 6\}$ includes 3 different elements and has a cardinality score of 3. As also seen, signal vectors S4 to S7 may change in X plane by a cardinality of a count of 3 (e.g., $\{x1,x3,x4,x3\}$), and may also change twice or have a cardinality score of 2 (e.g., $\{t10,t15\}$) along T plane. Thus, a cardinality of a sampled vector in space, time, or nodal dimensions may be determined, at least in part, by counting a number of different elements represented via changing moments in a set represented via dimensions or planes. Accordingly, based, at least in part, on an application of a dominance principle, it may be determined that signal vectors S1, S2, and S3 may be at least temporally dominant (e.g., along T plane), and that signal vectors S4, S5, S6, and S7 may be at least spatially dominant along X plane. Of course, this is merely one possible example of an application of a dominance principle to which claimed subject matter is not limited. Any suitable approaches, such as, for example, approaches utilizing bijective, injective, surjective functions, cardinal numbers, etc. may also be employed.

If it is determined that one or more attributes of a sampled signal are dominant, at operation 216, a cardinality map in any suitable format may be produced. Although claimed subject matter is not so limited, a cardinality map may, for example, be initially represented via a table, such as illustrated in FIG. 5 above. Based, at least in part, on a representation, a suitable format for a map to determine a degree or cardinality by identifying one or more dominant attributes along, for example, spatial, temporal, or nodal dimensions may include an example as illustrated in Table 2 below.

TABLE 1

Example format for a cardinality map.

X-cardinality = Select (distinct) X from Signal_samples
where signal vector between S1 and S7
Y-cardinality = Select (distinct) Y from Signal_samples
where signal vector between S1 and S7
Z-cardinality = Select (distinct) Z from Signal_samples
where signal vector between S1 and S7
T-cardinality = Select (distinct) T from Signal_samples
where signal vector between S1 and S7
N-cardinality = Select (distinct) graph_relationship(N)
from Signal_samples where signal vector between S1 and S As previously mentioned, a nodal relationship may typically, although not necessarily, comprise relational features rather than dimensional features, and may be represented, for example, via a sociogram or graph having a number of nodes connected together by associational links or ties. To determine one or more dominant attributes of a node or N-cardinality, samples of signals originating from identifiable nodes of an existing graph, such as, for example, a particular Hallmark store in San Francisco, as discussed above, may be used. As seen in Table 2 above, in one implementation, the notation "graph_relationship (N)" may be used to specify a canonical relationship between nodes of a graph for an N-related domain. In this context, a canonical relationship may refer to some established or existing relationship in which nodes are known, non-arbitrary, or otherwise identifiable. It should be appreciated that a nodal relationship may be represented via a directed graph, undirected graph, or any combination thereof. Of course, details relating to determining N-related cardinality are merely examples, and claimed subject matter is not limited in this regard.

Referring now back to FIG. 2, at operation 218, it may be determined whether a particular type of training, such as a clustering-based training utilizing a k-means-type process, for example, may be appropriate or may be useful. As previously mentioned, training may be implemented so as to characterize or understand the nature of one or more relationships between sampled signals, which may facilitate or support more effective or efficient signal processing, indexing, organization, or the like. As was also indicated, whether training is appropriate or may be useful, type of training, training intervals, or other training-related processes may, for example, be characterized or specified, in whole or in part, in a suitable configuration or initialization-type file, such as manifest file 400, just to illustrate one possible implementation.

Continuing with example process 200, if training may be appropriate or otherwise may be useful, at operation 220, a process may implement, for example, a clustering-based training. In some instances, a clustering-based training may include, for example, k-means clustering of STING cells to arrive at spatially, temporally, or nodally-dominated cluster zones or clusters derived from a sampled signal stream. For example, in an implementation, a "k" value of 3 may be used, meaning that a cluster map of three clusters, such as spatially, temporally, and nodally-oriented clusters, for example, would be created. Clusters may be created, for example, by partitioning STING cells represented via n-dimensional signal vectors, such as vectors discussed above in connection with FIG. 5, based, at least in part, on one or more dominant attributes. By applying k-means-type clustering, a sampled n-dimensional signal vector with one or more dominant attributes may belong to a respective cluster with a nearest mean. Relationships between sampled signal vectors may be determined based, at least in part, on vector proximity, which may be computed as a function of mutually relative distance between information points comprising k-means clusters. As described below, distance may be representative of, for example, one or more spatial, temporal, nodal, etc. relationships between sampled signals, or any combination thereof. In some instances, distance between sampled signals may be representative via a Hamming distance, for example, as will also be seen. However, these are merely examples of a particular application of clustering-based training, and claimed subject matter is not limited in scope in these respects.

If clustering-based training is omitted, then at operation 222 it may be determined whether correlation-based training may be appropriate or otherwise may be useful by referencing, for example, training-related fields in manifest file 400. If it is determined that correlation-based training may be appropriate or useful, example process 200 may continue to operation 224. In an implementation, correlation-based training may employ, for example, a Pearson's correlation coefficient to determine or learn one or more relationships between incoming STING cells representative of one or more sampled signals. For example, how sampled signals may be related may be evaluated by identifying statistically relevant trends or overarching similarities in signal trending with respect to time. Accordingly, an approach may employ, for example, a rate of change of sampled signal vectors over time or so-called signal vector derivatives. More specifically, a Pearson coefficient for an actual or forecasted signal stream may be respectively computed by utilizing values of corresponding sampled n-dimensional signal vectors and associated first, second, and third-order derivatives to evaluate how signals correlate in time. In this context, a second-order derivative may refer to a derivative of a first-order derivative, a third-order derivative may refer to a derivative of a second-order derivative, and so forth. Sample signal values with higher degrees of correlation may be stored in memory as a trained signal dataset, for example, and may be subsequently applied in connection with one or more operations associated with example process 200.

If is it determined that correlation-based training may be less useful, example process 200 may proceed to operation 226 for determination whether to implement evolutionary training. If yes, at operation 228, evolutionary training may be performed. For example, here, a concept of a genetic algorithm or process may be advantageously leveraged or applied so as to facilitate or support more effective or efficient characterization of a fitness function to arrive at a faster, less arbitrary, or otherwise more successful or useful conversion. In some instances, a fitness function may be characterized, for example, by one or more proximity-based parameters, such as a distance between signal vectors representative of STING cells. As described below, a distance between STING cells may be determined based, at least in part, on one or more applicable distance calculators. More specifically, during initialization, one or more chromosomes and their component genes, for example, may be identified or generated. A gene may be represented via one or more signal sample values in a binary, string, numeric, etc. format and may be associated with a STING cell's payload. By way of example but not limitation, a chromosome may comprise an automatic temperature control system realized as a thermostat having component genes specifying a thermostat's operating state, temperature, ambient condition, or the like. An initial set of STING cells (e.g., sampled from a thermostat, etc.) may be collected as a population and organized in memory. A parent set may be selected for reproduction in some manner. For example, a parent set may be selected based, at least in part, on knowledge assessed or evaluated from one or more training operations, such as, for example, clustering-based training at operation 220, correlation-based training at operation 224, or the like. Based, at least in part, on an application of a proximity-based fitness function, one or more new or child STING cells may be reproduced in a manner so as to approach an improved or "ideal state" or reach an improved or "optimal goal." One or more determinations may be made, for example, by assessing or evaluating distance between a child STING cell and an improved or "perfectly fit" or previously trained (e.g., clustering-based, correlation-based, etc.) STING cell. Of course, these details are merely examples relating to evolutionary training, and claimed subject matter is not so limited.

If evolutionary training is omitted, a process may continue to operation 230. Here, as a result of one or more training operations, such as operations 220, 224 or 228 described above, for example, one or more trained signal datasets may be created. It should be noted that a trained signal dataset may be stored in any suitable in-memory appliance, such as, for example, a database, file memory system, or like information repository. As schematically illustrated by dashed arrows at 232, a trained signal dataset may be used or applied in connection with one or more operations associated with example process 200. For example, in an implementation, a trained signal dataset may be utilized, in whole or in part, by an ecosystem configuration manager or like application programming interface (API) so as to facilitate or support more effective or efficient processing, indexing, presentation, visualization, etc., or any combination thereof.

Although claimed subject matter is not limited in this respect, a trained signal dataset may be utilized, for example, in connection with delta processing at operation 246, outgoing signal processing at operation 248, indexing at operation 242, or possibly other operations associated with example process 200. For example, if a trained signal dataset indicates that particular signals correlate sufficiently well over time, similarly or like trending incoming signals may be indexed or processed more intelligently. Namely, if it is observed that two particular signals are trending in a certain way, for example, then signal sample values for one signal may be indexed or processed so as to conserve computational resources, such as memory space, number of processing operations, or the like, since signal values for a second signal would be predictable, or otherwise ascertainable (e.g., from training, etc.). Of course, this is merely one possible example of an application of a trained signal dataset, and claimed subject matter in so limited.

With regard to operation 234, it may be determined whether one or more intermediate signals are missing or corrupted. Missing or corrupted signals may, for example, lack an informational component that may useful in evaluating sampled signals and may lead or result in less effective or efficient analysis, performance, processing, presentation, or the like. At operation 236, a Gaussian filter may be applied in some manner to eliminate or reduce noise, such as, for example, in a manner described above in connection with operation 210. Example process 200 may proceed to operation 238, at which point an error approximation operation may be performed. For example, if one or more space, time, node, etc. related signal sample values associated with one or more STING cells of a sampled signal are missing or otherwise corrupted, signal sample values may be interpolated to arrive at a statistically acceptable approximated values. In one implementation, a Shepard's method may be utilized, for example, to approximate missing signal sample values by applying weighted functions assigned to points in a scattered set of sampled signal values based, at least in part, on one or more dominant attributes associated with sampled STING cells.

If no, on the other hand, example process 200 may proceed to operation 240 for a determination regarding indexing for information structures, such as, for example, sampled STING cells. Indexing may typically, although not necessarily, be used to facilitate or support more effective or efficient signal processing by providing indexing options for faster look-up, access, performance, retrieval, or the like using appropriate techniques. If indexing is omitted, a process may by-pass operation 242 and may continue at operation 244. However, if it is determined that indexing may be appropriate or useful, at operation 242, STING cells associated with a sampled signal may be indexed in some manner based, at least in part, on one or more available indexing options. By way of example but not limitation, indexing options or strategies may be specified or characterized in a manifest file, such as manifest 400, for example, as previously mentioned. It should be appreciated that any suitable indexing techniques or processes, such as k-means indexing, spatial query indexing, tree-based indexing-type process, etc. may be used at operation 242. Various indexing techniques are known and need not be described here in greater detail. For example, in an implementation, indexing may be performed using one or more commercial statistical libraries. Indexed information structures may be stored in any suitable information repository, such as, for example, in-memory cache, file cache, or the like. It should also be noted that in an implementation, operation 242 may be optional, in which case example process 200 may proceed from operation 240 to operation 244.

At operation 244, n-dimensional information structures associated with a sampled signal may be organized in some manner into a system of STING cells. In some instances, a system of STING cells may comprise, for example, a space-time-node engine signal structure organized linearly in a suitable in-memory array. For example, n-dimensional STING cells may be organized based, at least in part, on one or more dominant attributes linearized as a function of mutually relative distance by performing a memory sweep with respect to one or more STING clusters having spatially, temporally, or nodally-dominant information points. Examples of a memory sweep so as to arrive at a linearized in-memory array will be described in greater detail below with reference to FIGS. 7-13.

As referenced at 246, example process 200 may implement a delta processing operation so as to compress one or more signal sample values associated with sampled information strictures, such as STING cells, for example, communicated over any suitable communication channel or link in connection with example process 200. Delta processing operation 246 may be implemented, in whole or in part, to reduce consumption of one or more process-related resources, such as, for example, memory space, transmission bandwidth, storage size, or the like. It should be appreciated that even though delta processing operation 246 is illustrated in connection with a certain processing sequence, such as following operation 244, for example, delta processing operation 246 may be implemented in connection with any suitable operation associated with example process 200. Here, one or more types of compression, such as lossy compression, lossless compression, or the like may be employed. Compression techniques may help to eliminate or reduce statistical or perceptual redundancy, facilitate or support signal consolidation, etc. and may be based, at least in part, on an application of approximation thresholds, loss of tolerance ratios, or the like. By way of example but not limitation, types of delta compression to be implemented or other compression-related operations may be characterized or specified, at least in part, in a manifest file, as was indicated.

With regard to operation 248, one or more STING cells associated with a linearized in-memory array may be processed in some manner so as to help, for example, with presentation of one or more spatio-temporal-nodal relationships of interest. More specifically, an outgoing signal processing may comprise, for example, a process of a relatively rapid pass on linearized memory locations for spontaneous de-serialization into a suitable output format. In some instances, an output format may comprise, for example, a raster or vector output format, which may aid in visualization, reporting, presentation, as mentioned above. Accordingly, outgoing signal processing may facilitate or support, for example, a number of visual options for delivering real-time, location-intelligent, context-relevant analytics capable of being intuitively displayed using one or more interfaces associated with computing platforms or devices, such as GPUs, animation controllers, dashboards, or the like.

Referring now to FIGS. 7-13 illustrating an example implementation of a memory sweep that may be performed, at least in part, in connection with operation 244 of FIG. 2. To simplify discussion, features or aspects of FIGS. 7-13 that may correspond to same or similar features or aspects, for example, or otherwise may be referenced in a similar fashion, are given the same reference numbers, where applicable. As previously mentioned, a memory sweep may facilitate or support effective or efficient in-memory organization in general, and a space-time-node engine signal structure in particular, depending, at least in part, on an implementation. A space-time-node signal structure may, for example, enhance or improve information analysis, retrieval, reporting, presentation, or the like, as previously mentioned.

Figure 7:
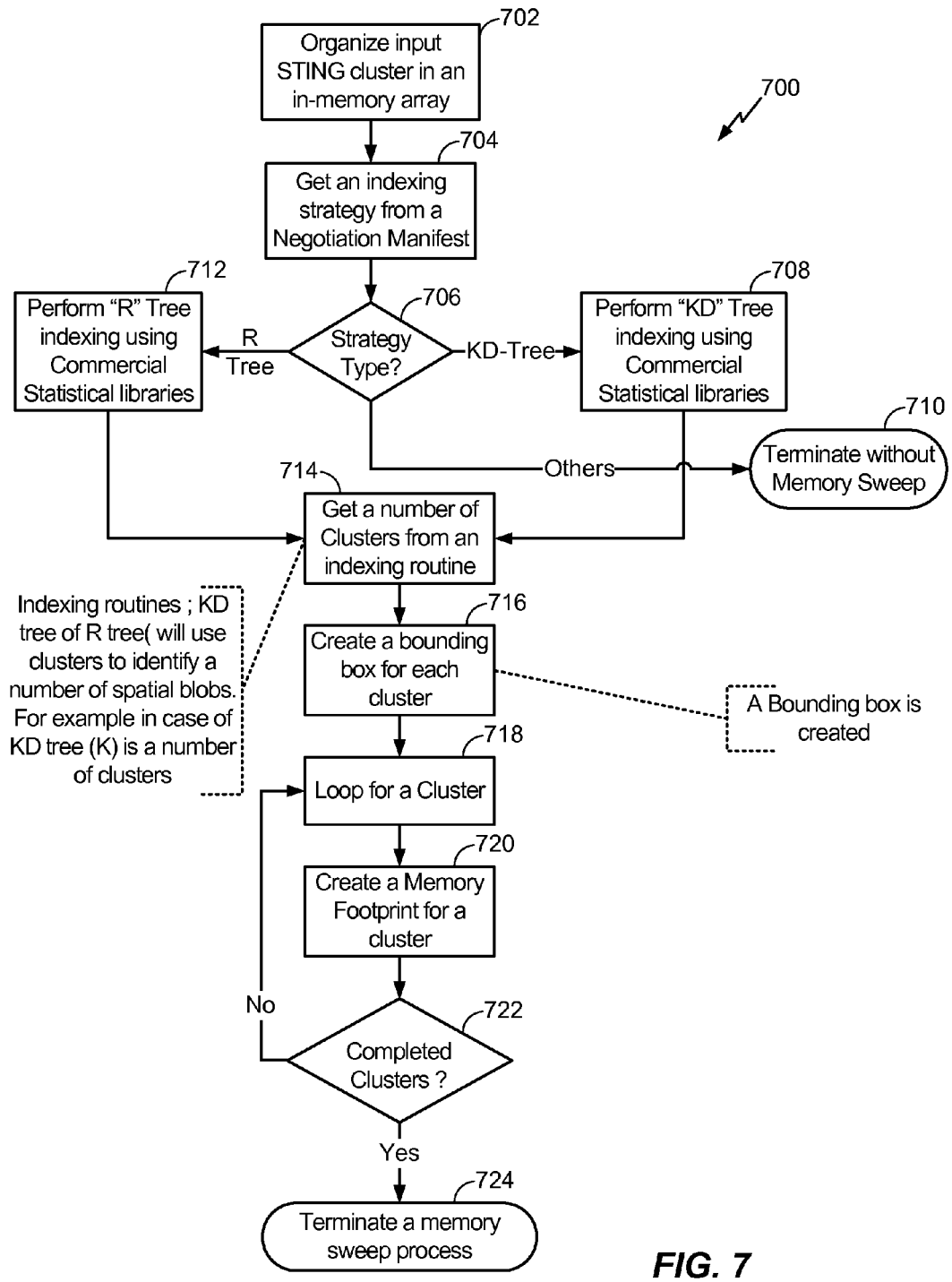
FIG. 7 is a flow diagram of an implementation of an example process that may be performed in connection with a memory sweep operation.

FIG. 7 is a flow diagram illustrating an implementation of an example process 700 that may be implemented, in whole or in part, to facilitate or support one or more operations or techniques in connection with a memory sweep. It should be noted that information acquired or produced, such as, for example, input signals, applications, output signals, operations, results, etc. associated with example process 700 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 700 may begin at operation 702 with organizing one or more input STING clusters in an in-memory array. As described below, one or more input clusters may be organized based, at least in part, on any suitable indexing strategy, depending, at least in part, on an implementation. As illustrated, in some instances, KD-tree-type indexing or R-tree-type indexing may be employed, though claimed subject matter is not so limited, of course. Indexing strategy may be characterized or specified, in whole or in part, in any suitable manifest or INI-type file, such as, for example, manifest file 400, as referenced at operation 704. Accordingly, at operation 706, a particular type of an indexing strategy, such as whether to perform an R-tree-type indexing or KD-tree-type indexing, for example, may be determined based, at least in part, on referencing manifest file 400. As previously mentioned, one or more indexing strategies may be performed using one or more techniques, such as by accessing, for example, a particular web-site associated with a suitable commercial statistical library (e.g., http://javadoc-.geotools.fr/2.2/org/geotools/index/rtree/RTree.html, http://www.java2s.com/Open-Source/Java-Document/Database-DBMS/perst/org/garret/perst/impl/KDTree.java.htm, etc.)

If a determination has been made in favor of a KD-tree-type indexing, for example, a process may proceed to operation 708 and further to operation 714 so as to generate a number of STING clusters based, at least in part, on a KD-tree-type indexing. If a KD-tree-type indexing approach does not converge, however, example process 700 may proceed to operation 710, for example, so as to be terminated in some manner, such as without performing a memory sweep. On the other hand, having an R-tree type indexing as a strategy may provide, for example, an advantage in the form of a stronger mode of convergence, thus, allowing a process to continue to operation 714 without being terminated.

Based, at least in part, on an R-tree-type indexing, KD-tree-type indexing, or any other suitable type of indexing, for example, at operation 714 one or more STING clusters may be generated or created, as mentioned above. In certain simulations or experiments, STING clusters included those illustrated in FIG. 8, though claimed subject matter is not so limited. Thus, using, at least in part, an R-tree-type indexing or KD-tree-type indexing, for example, STING cells associated with sampled signals may be organized in one or more clusters, such as clusters 802, 804, or 806. As alluded to previously, a STING cluster may comprise, for example, a number of information points, as indicated generally at 808, or units of spatio-temporal-nodal information sampled with respect to an information source. By way of example but not limitation, an information point may be representative of a signal sample value with respect to temperature, pressure, or the like, which may be referenced in connection with a certain point in time, particular location, etc., though claimed subject matter is not so limited.

At operation 716, a bounding box for a STING cluster may be created in some manner. For example, bounding boxes 810, 812, or 814 may be created for clusters 802, 804, and 806, respectively, by enclosing minimum-perimeter or volume areas around a cluster. As such, here, for a cluster, a bounding box may comprise, for example, an area with the smallest perimeter or volume within which all or most information points may fit or otherwise lie, though claimed subject matter is not so limited. For example, in some instances, a bounding box may be created by taking particular reference lines in a certain order, such as the minimum X, maximum Y for the upper left corner and the maximum X, minimum Y for the bottom right corner. Of course, this is merely an example, and claimed subject matter is not limited.

Referring back to FIG. 7, at operation 718, a loop for a cluster may be specified, such that a certain sequence or construct (e.g., creating a bounding box, memory footprint, etc.) may be carried out or repeated for any suitable number of clusters. With regard to operation 720, a memory footprint for a cluster may be created. For example, n-dimensional signal vectors having spatially, temporally, or nodally-dominated attributes, as described above, may be processed or transformed in some manner so as to arrive at two-dimensional representations of these vectors, and may be subsequently linearized or stored in one-dimensional memory as a function of mutually relative distance. A particular example of creating a memory footprint will be described in greater detail below with reference to FIG. 9. At operation 722, it may be determined whether example process 700 has been performed or completed for a suitable number of STING clusters, such as, for example, for all or most clusters created or generated at operation 716. Otherwise, then process 700 may return to operation 718 to repeat one or more functions associated with operations 720 and 722. On the other hand, alternatively, process 700 may terminate a memory sweep.

Figure 9:
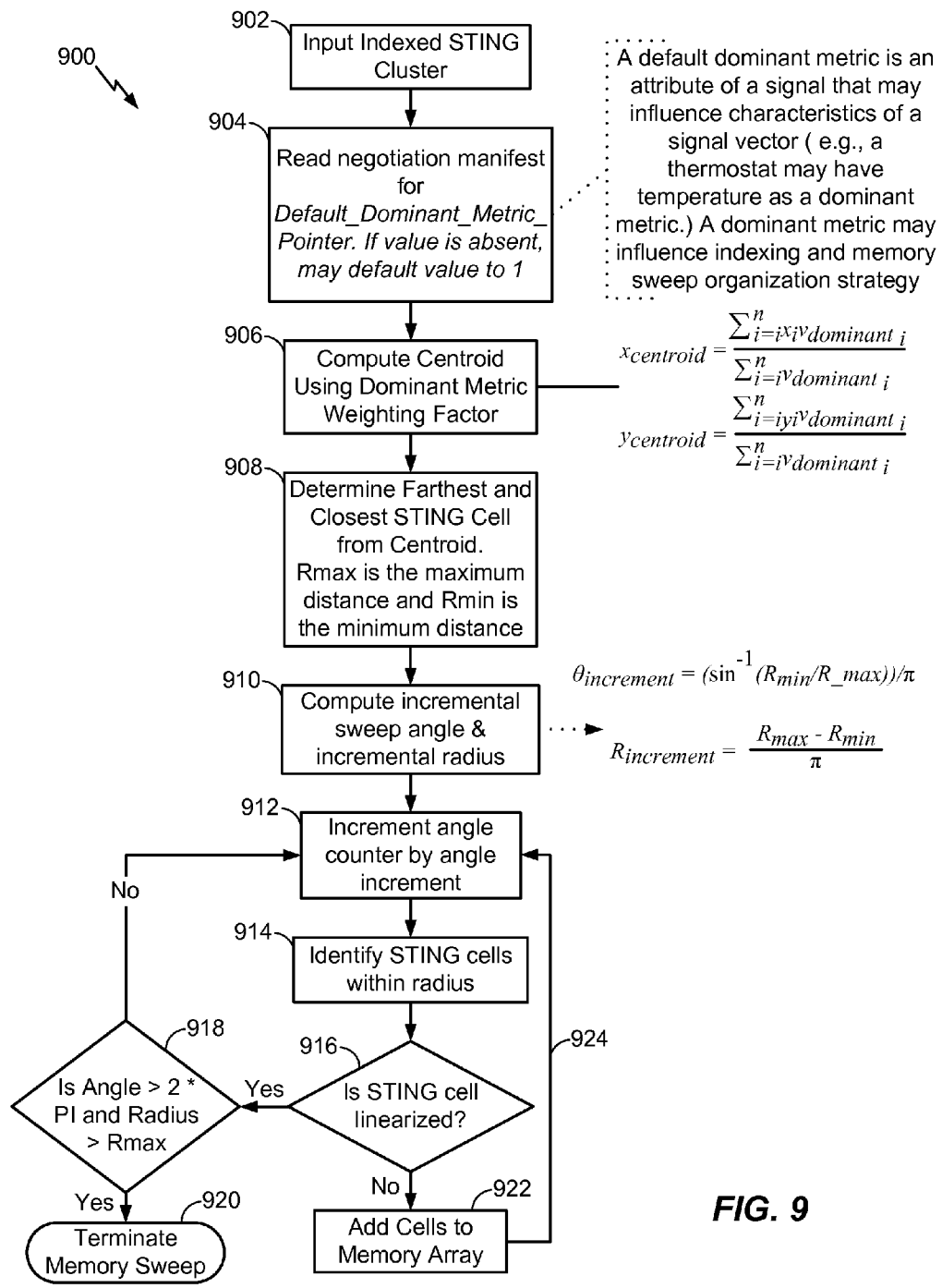
FIG. 9 is a flow diagram of an implementation of an example process that may be performed in connection with an example linearization operation.

FIG. 9 is a flow diagram illustrating an implementation of an example process 900 that may include a linearization operation, which may be performed, at least in part, in connection with one or more memory sweep operations, such as, for example, operation 720 of FIG. 7. Again, it should be noted that information acquired or produced, such as, for example, input signals, applications, output signals, operations, results, etc. associated with example process 900 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features, as was also indicated.

Figure 8:
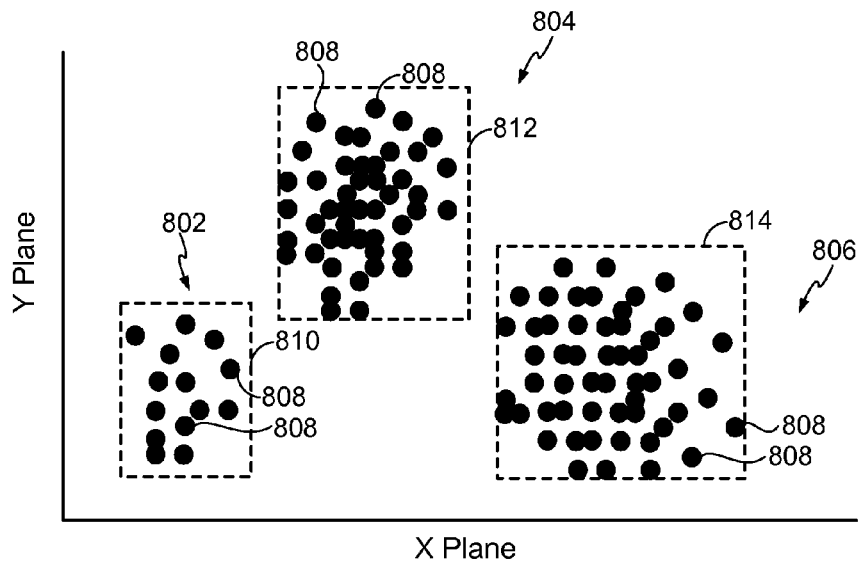
FIG. 8 illustrates an implementation of example STING clusters.

Continuing with process 900, a cluster of STING cells, such as cluster 802, 804, or 806 of FIG. 8, for example, indexed in some manner, such as in the manner described above in connection with operations 702-718 of FIG. 7, may be used as input signals, as indicated at operation 902. With regard to operation 904, example process 900 may reference any suitable manifest file (e.g., manifest file 400, etc.) so as to determine one or more dominant metrics of a sampled signal. In some instances, a dominant metric may comprise, for example, a default dominant metric that may be specified by a pointer referenced in a manifest file as Default_Dominant_Metric_Pointer, though claimed subject matter is not so limited. For example, a dominant metric may refer to a dominant attribute associated with a sampled STING cell. As previously mentioned, a dominant attribute may comprise an attribute that may be determined based, at least in part, on an application of a dominance principle and may influence one or more characteristics of an associated signal vector. By way of example but not limitation, a signal sampled with respect to a certain signal acquisition point, such as a thermostat, for example, may have a temperature as a dominant metric. As described below, a dominant metric may be represented via a dominant signal value vector $v_{dominant_i}$, for example, and may influence various process-related strategies, such as indexing, memory sweep, organization, or the like. If a signal value for a dominant metric is not declared (e.g., by a vendor, etc.) or otherwise not specified (e.g., in a manifest file, etc.), for example, a signal value of 1 may be used. Of course, details relating to a dominant metric are merely examples, and claimed subject matter is not limited in this regard.

Figure 10:
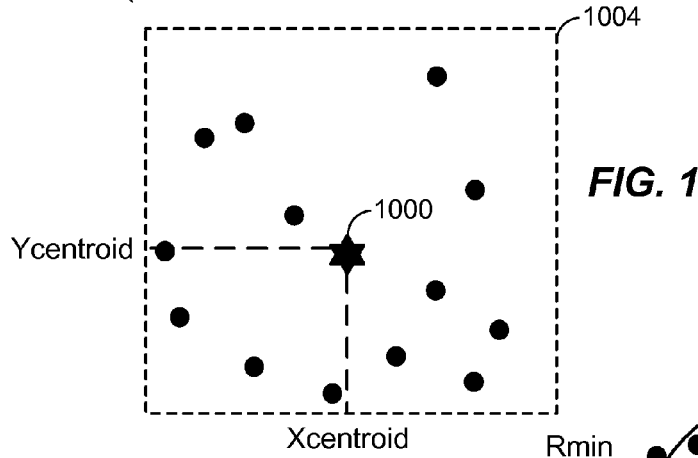
FIG. 10 illustrates an implementation of an example centroid of a STING cluster.
Figure 11:
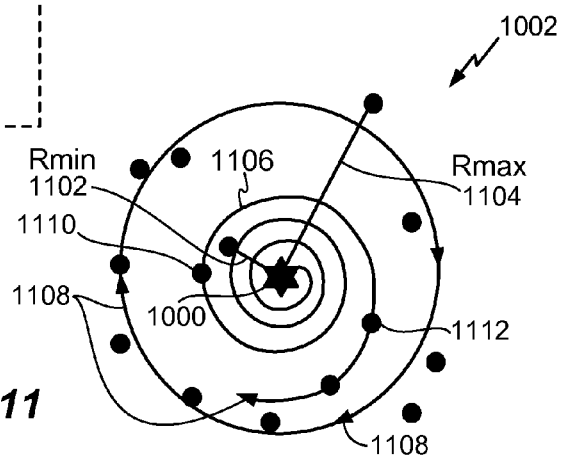
FIG. 11 illustrates an implementation of an example transitioning curve.

At operation 906, a centroid or center of mass for a cluster of STING cells may be computed in some manner. For example, as illustrated in FIG. 10, a centroid 1000 of a cluster of STING cells 1002 for a bounding box 1004 may be computed by specifying, for example, one or more dominant metric weighting factors. In some instances, a dominant metric weighting factor may be characterized, for example, by a dominant signal value vector $v_{dominant_i}$, just to illustrate one possible implementation. Thus, consider:

$$x_{centroid} = \frac{\sum_{i=i}^{n} x_i v_{dominant_i}}{\sum_{i=i}^{n} v_{dominant_i}} \quad (2)$$

$$y_{centroid} = \frac{\sum_{i=i}^{n} y_i v_{dominant_i}}{\sum_{i=i}^{n} v_{dominant_i}} \quad (3)$$

As such, n-dimensional signal vectors, such as signal vectors described above with reference to FIG. 5, for example, may be advantageously transformed so as to be represented in a two-dimensional space or matrix by specifying one or more dominant metric weighting factors that may be based, at least in part, on a function of mutually relative distance between STING cells associated with a sampled signal. In some instances, one or more distance calculators may be utilized to facilitate or support a representation. Particular examples of one or more spatial, temporal, nodal, etc. distance calculators will be described in greater detail below. Accordingly, based, at least in part, on distance-related calculations, centroid 1000 may comprise, for example, a two-dimensional center of mass for cluster 1002.

With regard to operation 908, it may be determined which STING cell of STING cluster 1002 is the closest to centroid 1000 and which STING cell is the farthest from centroid 1000. As particularly seen in FIG. 11, such a determination may be made based, at least in part, on computing the minimum Rmin and the maximum Rmax distances, as indicated at 1102 and 1104, respectively. In some instances, a Euclidian-based distance metric may be utilized, for example, to calculate respective Rmin and Rmax, though claimed subject matter is not so limited. For example, other distance calculators, such one or more distance calculators described below, may also be used. At operation 910, an incremental sweep angle $\theta_{increment}$ and an incremental radius $R_{increment}$ may be computed using, for example, following respective relations:

$$\theta_{increment} = (\sin^{-1}(R_{min}/R\_max))/\pi \quad (4)$$

$$R_{increment} = \frac{R_{max} - R_{min}}{\pi} \quad (5)$$

where π denotes a mathematical constant of approximately 3.14159.

At operation 912, computed sweep angle and radius may be specified as signal inputs so as to produce or generate, for example, a transitioning curve 1106. Transitioning curve 1106 may comprise a central point corresponding to centroid 1000, for example, and which curvature may increase by a value of an angle increment as curve 1106 unwinds in a spiral-like fashion, as illustrated. It should be noted that curve 1106 may be specified to emanate from centroid 1000 in any suitable direction, such as counter-clockwise or, optionally or alternatively, clockwise, for example, as referenced by arrows at 1108. For example, a sweep angle or radius may be incremented in some manner, such as by an angle counter, for example, utilizing a value computed via Relations 4 or 5 above. While sweeping and as a curvature of curve 1106 increases, such as due to a specified angle increment, for example, a leading or endpoint of curve 1106 may encounter a number of information points representative of STING cells, such as a point 1110, 1112, and so forth. Accordingly, using curve 1106 in a spiral-like fashion, information points within a bounding box, such as bounding box 1104, for example, may be identified or located.

Figure 12:
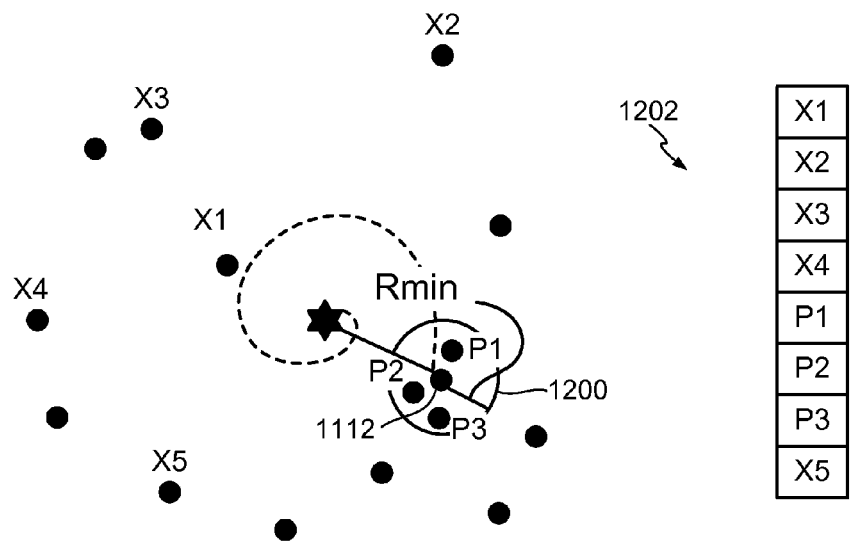
FIG. 12 illustrates an implementation of an example STING cluster and memory array in connection with an example linearization operation.

Having located an information point, such as point 1112, for example, process 900 may continue to operation 914 so as to identify or locate all or some information points within a certain distance from point 1112. For example, as illustrated in FIG. 12, to identify information points, a circle 1200 may be generated or formed around information point 1112 by specifying the distance Rmin, just to illustrate one possible implementation. All or some information points inside circle 1200 may be linearized based, at least in part, on in-circle distance calculations with respect to these points utilizing, for example, Euclidian distance metrics. Optionally or alternatively, distance may be calculated by utilizing applicable distance calculators referenced or characterized in memory sweep-related fields in a manifest file. Applicability of a distance calculator may depend, at least in part, on types of one or more dominant attributes associated with respective in-circle information points of interest, for example. One or more distance calculators will be described in greater detail below. By way of example but not limitation, linearized in-memory array may include one referenced by arrow at 1202. Information points X1-X4 may be representative of signal sample values linearized based, at least in part, on in-circle distance calculations, such as, for example, distance calculations utilizing Euclidian distance metrics for a two-dimensional plane. Points P1-P3 may represent signal values linearized via an application of Euclidian-Temporal distance calculations, as another possible example. It should be appreciated, however, that signal values, distance calculators, or in-memory array shown are merely examples to which claimed subject matter is not limited.

At operation 916, it may be determined if a certain identified information point representative of a particular STING cell, such as a STING cell P1, P2, or P3 within circle 1200, for example, has already been linearized. Encountering a linearized information point may indicate that one or more memory sweep parameters, such as an incremental sweep angle or radius, for example, may be less than adequate or somewhat insufficient, which may prompt example process 900 for suitable parameter evaluation, as referenced at operation 918. In certain simulations or experiments, a computed increment angle or radius were evaluated as follows:

{is angle>2*PI?}

{is radius>Rmax?}, where PI denotes a mathematical constant π of approximately 3.14159. If yes, at operation 920, a memory sweep may be terminated. On the other hand, if no, example process 900 may return to operation 912 to perform suitable parameter adjustments, such as incrementing a sweep angle, for example. With regard to operation 922, linearized STING cells may be added to an in-memory array and may be stored in any suitable manner, such as, for example, in the manner described above. As illustrated by arrow 924, example process 900 may include repeating one or more operations, such as operations 912-916, for example, so as to facilitate or support linearization of all or some of STING cells associated with a cluster of interest.

As previously mentioned, one or more distance calculators may be utilized, in whole or in part, to facilitate or support transforming n-dimensional signal vectors associated with a sampled signal into one-dimensional representations including, for example, a linearization operation discussed above. In some instances, distance calculators may be realized as a set of APIs that may help to identify relationships or strengths of relationships between sampled signals based, at least in part, on proximity between information points of interest. As described above, a sampled signal may be represented, for example, via one or more n-dimensional signal vectors, such that $S_i = \{x_i, y_i, z_i, t_i, N_i, v1_i, v2_i \ldots \}$. Thus, a distance between two sampled signals $S_1 = \{x_1, y_1, z_1, t_1, N_1, v1_1, v2_1 \ldots \}$ and $S_2 = \{x_2, y_2, z_2, t_2, N_2, v1_2, v2_2 \ldots \}$ may be characterized, for example, as $D_{12} = \text{distance}(S_1, S_2)$. In one implementation, distance calculators may be specified or characterized in any suitable configuration or initialization-type file, such as, for example, manifest file 400, as was also indicated. For example, distance calculators may include those listed below, though claimed subject matter is not so limited.

SPATIAL2D. Spatial Euclidean distance for a two-dimensional or {X,Y} plane. Distance $D_{12}$ may be calculated using, for example, the following Relation:

$$D_{12} = \sqrt{(x_2 - x_1)^2 + (y_2 - y_1)^2} \quad (6)$$

SPATIAL3D. Spatial Euclidean distance for a three-dimensional or {X, Y, Z} plane. $D_{12}$ may be calculated, for example, as:

$$D_{12} = \sqrt{(x_2-x_1)^2+(y_2-y_1)^2+(z_2-z_1)^2} \quad (7)$$

SPATIO_TEMPORAL. Spatio-Temporal Euclidean distance in a {X, Y, Z, T} plane or dimension. Distance $D_{12}$ may be calculated as:

$$D_{12} = \sqrt{K(t_2-t_1)^2+(x_2-x_1)^2+(y_2-y_1)^2+(z_2-z_1)^2} \quad (8)$$

where K denotes a dimensional factor conversion notated in a unit that is a {distance measure}/{time measure}. In one implementation, K=1 may be used, though claimed subject matter is not so limited.

SPATIO_NDIMENSIONAL. Euclidean Distance in an N-dimensional plane or domain. Distance $D_{12}$ may be calculated, for example, using the following relation:

$$D_{12} = \sqrt{\sum_{i=i}^{n}(p_{1i}-p_{2i})^2} \quad (9)$$

where $p_i$ is the $i^{th}$ component vector out of n components, such that, for example, $p_{11}=x_1$ and $p_{12}=y_1$ and ... $p_{1n}=v1_2$.

TEMPORAL. Difference in time-related moments. For a calculator, distance $D_{12}$ may be defined, for example, as:

$$D_{12}=t_2-t_1 \quad (10)$$

NODAL_DISTANCE_AFFINITY. Distance between nodes based on the affinity of nodes. For two sampled signals, such as, for example, signals $S_1=\{x_1,y_1,z_1,t_1,N_1,v1_1,v2_1 \ldots\}$ and $S_2=\{x_2,y_2,z_2,t_2,N_2,v1_2,v2_2 \ldots\}$, having sample value vectors representative of pressure, temperature, etc., distance $D_{12}$ may be computed, at least in part, by utilizing the Hamming distance measure or $D_{ij}$, just to illustrate one possible implementation. Thus, by way of example but not limitation, the following approach may be used:

Loop through value vectors. For example, a value vector may be compared against similar value vector of another signal, such that

| $v1_1=v1_2$? | $v2_1=v2_2$? | $v3_1=v3_2$? | $v4_1=v4_2$? |
|---|---|---|---| and so forth through, for example, $v7_1=v7_2$?, depending, at least in part, on implementation.

Create a binary signal value or bitmap register with respect to value vectors. Thus, consider:

| $Bitmap_1 =$ | Binary($v1_1$) | Binary($v2_1$) | Binary($v3_1$) | ... | Binary($v7_1$) |
|---|---|---|---|---|---|

For purposes of explanation, a word like "hello" may be represented via a binary string 0110100001100101011011000110110001101111.

Compute the Hamming distance, for example, as:

$$D_{ij}=\text{Hamming Distance}(Bitmap_i, Bitmap_j)$$

Hamming distance may be utilized, for example, to identify related nodes (e.g., democratic leadership, etc.) that are close to relatively stronger nodes (e.g., the President—the Vice President, etc.) in a sociogram or graph-type relationship (e.g., the Democratic Party, etc.). Hamming distance computations are known and need not be described here in greater detail.

NODAL_DISTANCE_DEGREE_OF_SEPARATION. Distance between nodes is based, at least in part, on degree of separation within a graph. A degree of separation distance $D_{12}$ may refer to a distance between two nodes in a graph calculated using a smallest number of links connecting nodes. An example Nodal Distance Degree of Separation calculator may be illustrated with reference to FIG. 13. As previously mentioned, nodes in a graph, such as a graph 1300, may be representative of sampled signals having signal values descriptive, for example, of canonical relationships within a graph. For graph 1300, two nodes, such as nodes 4 and 8, for example, may be represented via signal vectors as $S_4=\{x_4,y_4,z_4,t_4,N_4,v1_4,v2_4 \ldots\}$ and $S_8=\{x_8,y_8,z_8,t_8,N_8,v1_8,v2_8 \ldots\}$, respectively. For example, node 4 may be traversed to node 8 by following links to nodes 3, 7, 6, and 2, respectively. However, node 4 may also be traversed to node 8 by following one link or edge. Accordingly, a distance calculator may follow or navigate the smallest number of links to arrive from node 4 to node 8, which is 1. As such, the degree of separation between signals $S_4$ and $S_8$ is 1 or $[d_{4,8}=1]$.

Further, a mean of all distances for graph 1300 may be computed. For example, for a node, compute the minimum degree of separation with respect to other nodes. By way of example but not limitation, for Node or Signal 1, the minimum degree of separation with respect to other nodes (e.g., signals) in graph 1300 may include those illustrated in Table 3 below, though claimed subject matter is not so limited.

TABLE 3

Examples of minimum degrees of separation for Node or Signal 1

| | |
|---|---|
| Signal 1 -> Signal 2 | 1 |
| Signal 1 -> Signal 3 | 1 |
| Signal 1 -> Signal 4 | 1 |
| Signal 1 -> Signal 5 | 2 |
| Signal 1 -> Signal 6 | 2 |
| Signal 1 -> Signal 7 | 2 |
| Signal 1 -> Signal 8 | 1 |

Accordingly, here, a mean of distances for Node or Signal 1 may be computed as $\{1+1+1+1+2+2+2\}=10/7=1.43$.

By way of example but not limitation, for a canonical relationship of graph 1300, an approach for determining the minimum degree of separation with respect to other nodes (e.g., signals) in may include one illustrated in Table 3 below, though claimed subject matter is not so limited. Thus, consider:

TABLE 4

Example of determining the minimum degrees of separation for a graph.

| | |
|---|---|
| Signal 1 -> Signal 2 | 1 |
| Signal 1 -> Signal 3 | 1 |
| Signal 1 -> Signal 4 | 1 |
| Signal 1 -> Signal 5 | 2 |
| Signal 1 -> Signal 6 | 2 |
| Signal 1 -> Signal 7 | 2 |
| Signal 1 -> Signal 8 | 1 |
| Signal 2 -> Signal 1 | <double counted> so eliminate from calculation |
| Signal 2 -> Signal 3 | 2 |
| Signal 2 -> Signal 4 | 2 |
| ... | |
| ... | |
| Signal 8 -> Signal 6 | 1 |
| Signal 8 -> Signal 7 | 2 |

Likewise, a mean of all distances (e.g., for all nodes) for graph 1300 may be computed in a similar fashion.

Accordingly, a distance $D_{12}$ between two signals or nodes of interest (e.g., information points, etc.) may be calculated as a degree of separation between signals divided by a mean of all distances for a particular graph associated with these signals, or:

$$D_{12} = [\text{degree of separation between signals}]/[\text{mean of all distances}] \quad (11)$$

Figure 14:
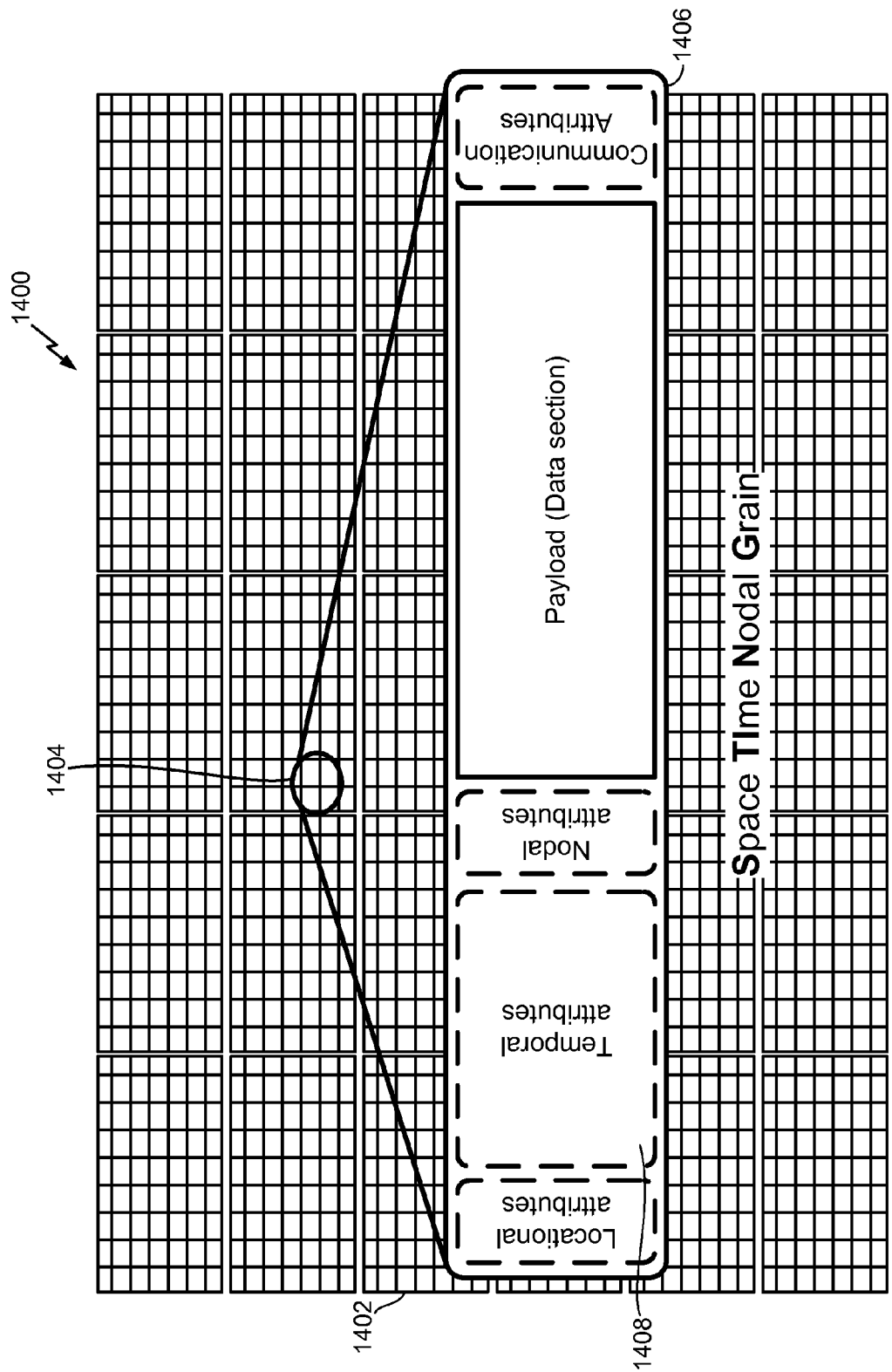
FIG. 14 is a schematic representation of an implementation of an example space-time-node engine signal structure.

FIG. 14 is a schematic representation of an implementation of an example space-time-node engine signal structure 1400. As seen, space-time-node engine signal structure 1400 may comprise, for example, a number of STING cells that may be converted in some manner so as to comply with a particular signal configuration. For example, in some instances, a number of STING cells that may be converted so as to be organized in a one-dimensional or linearized in-memory array 1402. As also illustrated, STING cells may be organized such that a number of certain STING cells, such as temporally-dominant STING cells 1404, for example, may cluster together so as to be adjacent or in sufficiently close proximity in memory. As previously mentioned, one or more dominant attributes of a STING cell, such as temporal attributes 1408, for example, may be identified or determined based, at least in part, on an application of a dominance principle in a suitable manner, such as in a manner discussed above. As previously mentioned, in-memory arrangement of STING cells may be characterized based, at least in part, on mutually relevant distance between corresponding information points computed via one or more distance calculators. Optionally or alternatively, STING cells may be organized in memory based, at least in part, on Hamming distance, as was also indicated. By having STING cells organized or arranged as a function of mutually relative distance, for example, space-time-node engine signal structure 1400 may implement faster information accessing or retrieving. This may help to anticipate preferences including, for example, user preferences with respect to n-dimensional content (e.g., queries, etc.) or information that may be associated with a variety of sources or communicated in a variety of formats, thus, facilitating or supporting more effective or efficient information processing, analysis, reporting, presentation, etc., or any combination thereof.

Figure 16:
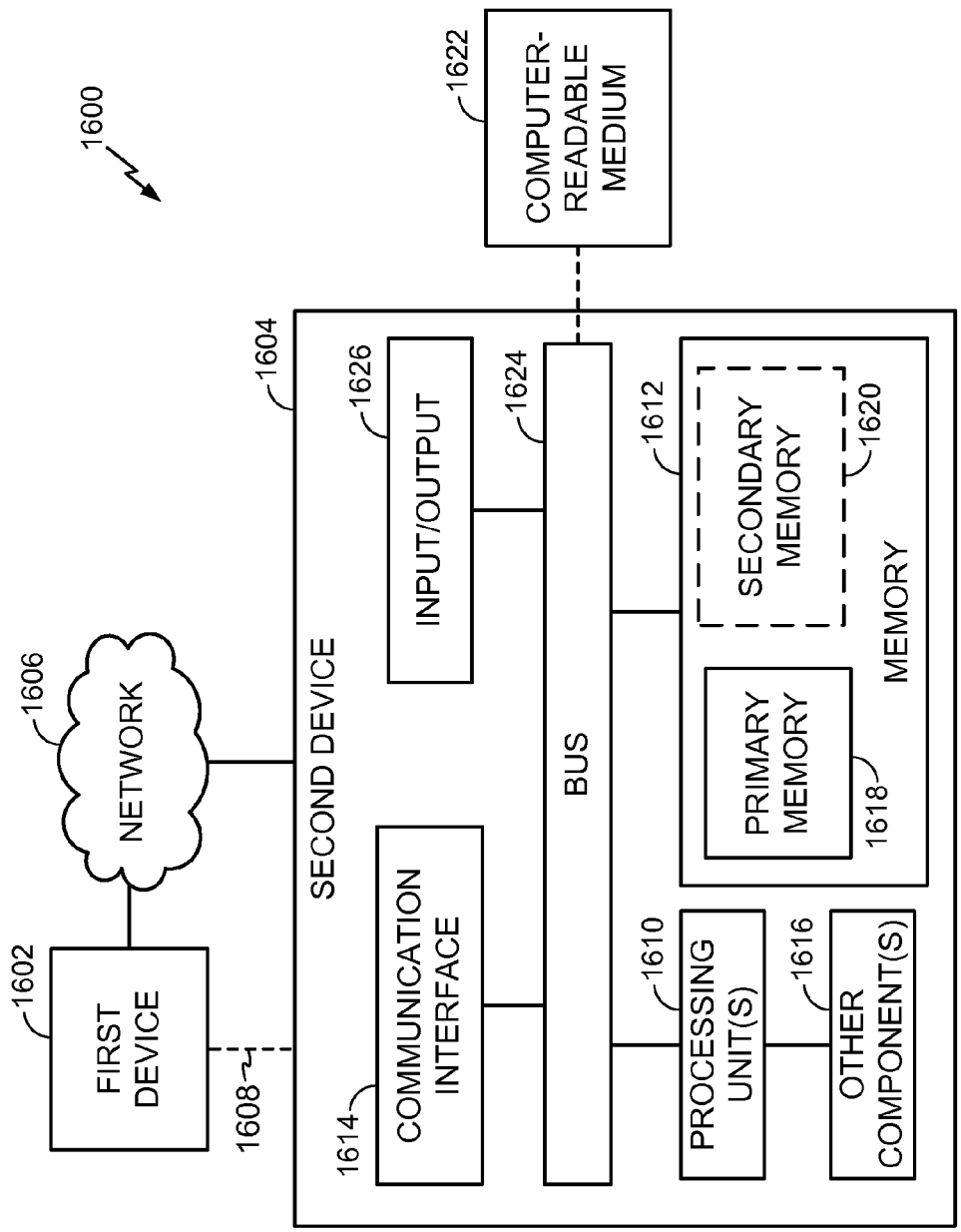
FIG. 16 is a schematic diagram illustrating an implementation of a computing environment associated with one or more special purpose computing devices.

FIG. 16 is a schematic diagram illustrating an implementation of an example computing environment 1600 that may include one or more devices or platforms capable of partially or substantially implementing one or more processes or operations in connection with a space-time-node engine signal structure, such as, for example, space-time-node signal structure 1400 of FIG. 14. Computing environment system 1600 may include, for example, a first device 1602 and a second device 1604, which may be operatively coupled together via a network 1606, though claimed subject matter is not so limited. For example, first device 1602 and a second device 1604 may be operatively coupled together via a communication link 1608, which may or may not be associated with network 1606. Optionally or alternatively, first device 1602 and second device 1604 may comprise or be a part of a certain computing platform, such as a platform associated, for example, with a space-time-node engine. In an implementation, first device 1602 and second device 1604 may be representative of any electronic device, appliance, machine, or the like that may have capability to exchange signal information, such as multi-source information, for example, over network 1606, communication link 1608, or the like. Network 1606 may represent one or more communication links, processes, or resources having capability to facilitate or support exchange or communication of signal information between first device 1602, second device 1604, or the like.

In an implementation, first device 1602 or second device 1604 may be capable of facilitating or supporting one or more processes or operations associated with computing environment 1600, such as, for example, process 200 of FIG. 2, process 700 of FIG. 7, process 900 of FIG. 9, or the like. As previously mentioned, first device 1602 may comprise, for example, a sensor associated with a signal acquisition point, just to illustrate one possible implementation. Second device 1604 may comprise, for example, at least one processor and memory that may be configurable to exchange data or information over any suitable communications network. For example, second device 1604 may include one or more computing devices or platforms capable of communicating with, for example, a laptop computer, a desktop computer, a tablet PC, a cellular telephone, an access point, a transceiver chip, an e-book reader, a workstation, a server device, a data storage unit, a file system, a sensor, or the like. In certain implementations, first device 1604 or second device 1604 may take the form of one or more integrated circuits, circuit boards, or the like that may be operatively enabled for use in another device.

It should be appreciated that all or part of various components shown in connection with computing environment 1600, or the processes or operations as described herein, may be implemented using or otherwise include hardware, firmware, or any combination thereof along with software. It should also be noted that computing environment 1600 may include more, fewer, or different components from those that are illustrated. Although not shown, optionally or alternatively, there may be additional devices operatively coupled to first device 1602, second device 1604, etc. to facilitate or otherwise support one or more processes or operations associated with computing environment 1600. Thus, unless stated otherwise, to simplify discussion, various functionalities, elements, components, etc. as described below with reference to second device 1604 may also be applicable to other devices, such as first device 1602, for example, or devices not shown so as to facilitate or support one or more processes associated with example computing environment 1600.

As illustrated, second device 1604 may include at least one processing unit 1610, memory 1612, communication interface 1614, and one or more other components, indicated generally at 1616, for example, so as to facilitate or support one or more processes or operations in connection with a space-time-node engine signal structure. Processing unit 1610 may be implemented in hardware or a combination of hardware and software. Processing unit 1610 may be representative of one or more circuits configurable to perform at least a portion of information computing techniques or processes. By way of example but not limitation, processing unit 1610 may include one or more processors, controllers, microprocessors, microcontrollers, application specific integrated circuits, digital signal processors, programmable logic devices, field programmable gate arrays, etc., or any combination thereof.

Memory 1612 may store, comprise, or otherwise provide access to computer-readable instructions, such as a program, an application, etc. or portion(s) thereof, including, for example, initialization or configuration files, information structures, processor-executable instructions or code, or the like that may be accessible or executable by processing unit 1610. Execution of such instructions by processing unit 1610 may transform second device 1604 into a special purpose computing device, apparatus, platform, etc., or some combination thereof. Memory 1612 may represent any information or signal storage medium or mechanism. For example, memory 1612 may include a primary memory 1618 and a secondary memory 1620. Primary memory 1618 may include, for example, a random access memory, read only memory, or the like and may comprise information with respect to one or more training signal datasets, cardinality maps, indexing options, manifest classes or properties, linearized values, STING cells or clusters, various thresholds (e.g., sweep angle, radius, etc.) dominant attributes, or other suitable or desires information to facilitate or support one or more processes or operations in connection with a space-time-node engine signal structure. While illustrated in this example as being separate from processing unit 1610, it should be appreciated that all or part of memory 1612 may be provided within or otherwise co-located/coupled with processing unit 1610.

Secondary memory 1620 may include, for example, the same or similar type of memory as primary memory. In certain implementations, secondary memory 1620 may comprise, for example, one or more information storage devices or systems, such as, for example, a disk drive, an optical disc drive, a tape drive, a solid state memory drive, or the like. Secondary memory 1620 may be operatively receptive of, or otherwise enabled to be coupled to, a computer-readable medium 1622. Computer-readable medium 1622 may include, for example, any medium capable of storing or providing access to information, code, or instructions (e.g., an article of manufacture, etc.) for second device 1604 or any other device associated with computing environment 1600. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Computer-readable medium 1622 may be accessed by processing unit 1610, for example. As such, in certain example implementations, the methods or apparatuses may take the form, in whole or in part, of a computer-readable medium that may include computer-implementable instructions stored thereon, which, if executed by at least one processing unit or other like circuitry, may enable processing unit 1610 or the other like circuitry to perform all or portions of a memory sweep operation, or any operation or process to facilitate or otherwise support a space-time-node engine structure. In certain example implementations, processing unit 1610 may be capable of performing or supporting other functions associated with computing environment 1600, such as signal acquisition, training, presentation, communication, routing, or the like.

Communication interface 1614 may allow for communication with one or more devices or systems associated with computing environment 1600 over one or more wired or wireless communication links. In certain implementations, communication interface may comprise, for example, a function or class-type driver or adapter (e.g., a STING adapter, etc.) that may provide for or otherwise support communicative coupling between different levels or layers of an architecture or a part of an architecture associated with computing environment 1600, as previously mentioned. Although not shown, second device 1604 may include a power source to provide power to some or all of the components or circuitry. A power source may be a portable power source, such as a battery, for example, or may comprise a fixed or stationary power source, such as an outlet (e.g. in a building, electric charging station, car, etc.). It should be appreciated that a power source may be integrated into (e.g., built-in, etc.) or otherwise supported by (e.g., stand-alone, etc.) second device 1604. A power source may also be a transportable power source, such as a solar panel, carbon-fuel-based generator, or the like. Also, components or circuitry of second device 1604 may include an analog-to-digital converter (ADC) for digitizing output signals, for example.

Second device 1604 may also include one or more buses or connections 1624 (e.g., connectors, lines, conductors, optic fibers, etc.) to operatively couple various circuits or components together including, for example, one or more other components 1616. As also seen, second device may comprise, for example, an input/output device 1626. Input/output device 1626 may represent one or more devices or features that may be able to accept or otherwise input human or machine instructions, or one or more devices or features that may be able to deliver or otherwise output human or machine instructions. By way of example but not limitation, input/output device may include, for example, a user interface, such as display, touch screen, keypad, buttons, knobs, microphone, speaker, trackball, data port, or the like. Other components 1616, if present, may comprise one or more other device, features, functionalities, or the like capable of facilitating or supporting one or more operations or processes implemented by second device 1604, such as operations in connection with a space-time-node engine signal structure, for example.

According to an implementation, one or more portions of a device associated with computing environment 1600, such as first device 1602, second device 1604, or the like, for example, may store one or more binary digital electronic signals representative of information expressed as a particular state of a device. To illustrate, an electrical binary digital signal representative of information may be "stored" in a portion of memory 1612 of second device 1604 by affecting or changing a state of particular memory locations, for example, to represent information as binary digital electronic signals in the form of ones or zeros. As such, in a particular implementation of a device, such a change of state of a portion of a memory within a device, such a state of particular memory locations, for example, to store a binary digital electronic signal representative of information constitutes a transformation of a physical thing, such as memory 1612, for example, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more information files or a database specifying or otherwise associated with an index, in-memory or otherwise.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
    acquiring one or more sampled signals comprising digital signal vectors having one or more attributes; and
    converting said digital signal vectors based, at least in part, on features of said one or more attributes, wherein said converting said digital signal vectors comprises:
        electronically identifying one or more dominant attributes among a number of attributes associated with said one or more digital signals; and
        electronically applying a memory sweep operation to said one or more identified dominant attributes, wherein said applying said memory sweep operation to said one or more identified dominant attributes further comprises electronically generating a transitioning curve to locate said one or more identified dominant attributes, said transitioning curve is generated based, at least in part, on electronically specifying an incremental sweep angle and an incremental radius.

2. The method of claim 1, wherein said converting said digital signal vectors comprises formatting said digital signal vectors based, at least in part, on said features of said one or more attributes.

3. The method of claim 1, wherein said one or more attributes comprises at least one of the following: an attribute relating to time; an attribute relating to space; an attribute relating to a node; or any combination thereof.

4. The method of claim 1, wherein said features of said one or more attributes includes a cardinality score based, at least in part, on a count of changing sample signal value levels of said digital signal vectors.

5. The method of claim 1, wherein said features of said one or more attributes includes, at least in part, a relationship among nodes of a graph.

6. The method of claim 5, wherein said relationship comprises, at least in part, a canonical relationship among said nodes of said graph.

7. The method of claim 1, wherein said converting is based, at least in part, on an application of a dominance principle.

8. The method of claim 7, wherein said application of said dominance principle comprises arranging said digital signal vectors in accordance with a degree of cardinality.

9. The method of claim 1, wherein said converting comprises arranging said digital signal vectors to comply with a particular signal configuration.

10. The method of claim 9, wherein said particular signal configuration comprises a linear signal configuration.

11. The method of claim 9, wherein said particular signal configuration comprises a Hamming distance-based signal configuration.

12. An apparatus comprising:
    a computing platform having a capability to:
    acquire one or more sampled signals comprising digital signal vectors having one or more attributes; and
    format said digital signal vectors based, at least in part, on features of said one or more attributes, wherein said computing platform having said capability to format said digital signal vectors further to:
        electronically identify one or more dominant attributes among a number of attributes associated with said one or more digital signals; and
        electronically apply a memory sweep operation to said one or more identified dominant attributes, said memory sweep operation being applied to said one or more identified dominant attributes to electronically generate a transitioning curve to locate said one or more identified dominant attributes, said transitioning curve is generated based, at least in part, on electronically specifying an incremental sweep angle and an incremental radius.

13. The apparatus of claim 12, wherein said one or more attributes comprises at least one of the following: an attribute relating to time; an attribute relating to space; an attribute relating to a node; or any combination thereof.

14. The apparatus of claim 12, wherein said features of said one or more attributes includes a cardinality score based, at least in part, on a count of changing sample signal value levels of said digital signal vectors.

15. The apparatus of claim 12, wherein said computing platform having a capability to format said digital signal vectors is having a capability to format based, at least in part, on an application of a dominance principle.

16. The apparatus of claim 15, wherein said application of said dominance principle enables said computing platform to arrange said digital signal vectors in accordance with a degree of cardinality.

* * * * *